United States Patent

Yamada et al.

[11] Patent Number: 5,802,202
[45] Date of Patent: Sep. 1, 1998

[54] METHOD OF DETERMINING THREE DIMENSIONAL POSITION OF OBJECT AND APPARATUS THEREFOR

[75] Inventors: Naoki Yamada; Kazumoto Tanaka; Makoto Shinohara, all of Hiroshima-ken, Japan

[73] Assignee: Mazda Motor Corporation, Hiroshima, Japan

[21] Appl. No.: 364,184

[22] Filed: Dec. 27, 1994

[30] Foreign Application Priority Data

Dec. 24, 1993 [JP] Japan ................. 5-328060
Jun. 29, 1994 [JP] Japan ................. 6-147938

[51] Int. Cl.⁶ .................................................. G06K 9/00
[52] U.S. Cl. .................................................. 382/154
[58] Field of Search ................. 382/141, 152, 382/154, 291; 348/94, 135; 356/373, 375; 364/460, 474.28, 474.36

[56] References Cited

U.S. PATENT DOCUMENTS 5,153,721  10/1992  Eino et al. ................. 358/107
5,280,542  1/1994   Ozeki et al. ................ 382/8
5,446,798  8/1995   Morita et al. ............... 382/154
5,581,665  12/1996  Sugiura et al. ............. 395/86

FOREIGN PATENT DOCUMENTS 2-38804  2/1990  Japan ................. G01B 11/00

*Primary Examiner*—Andrew W. Johns
*Attorney, Agent, or Firm*—Martin Fleit, PA

[57] ABSTRACT

A method of determining the three-dimensional position of an object in a specific position with respect to a predetermined standard position includes storing position data representative of a distinctive part of the object as if the object is virtually located in a predetermined standard position, formularizing a relation between the specific and standard positions in terms of a standard three-dimensional co-ordinate system as an equation including a positional deviation as an unknown parameter, and determining a restrictive condition for the position of the distinctive part of the object located in the specific position. The equation is solved under a condition in which the position of the distinctive part satisfies the restrictive condition to find a positional deviation.

15 Claims, 11 Drawing Sheets

METHOD OF DETERMINING THREE DIMENSIONAL POSITION OF OBJECT AND APPARATUS THEREFOR

BACKGROUND OF THE INVENTION

1. Field of the Invention

The present invention relates to a method of determining the three dimensional position of an object and an apparatus therefor.

2. Description of Related Art

It has been known to recognize automatically the three dimensional position of an object by means of an image superposition. Much attention has been given to various optical approaches relating to image manipulating techniques which involve the measuring of positional deviation of an object from a known reference position by means of moving an image of the object and placing it upon a virtual image in the reference position through trial and error. Such a three dimensional position measuring instrument is known from, for instance, Japanese Unexamined Patent Publication No. 2-38804.

In the prior art three dimensional position measuring method, it is essential to try parallel translation and/or rotation of an image of an object so as to place it perfectly upon an image in a predetermined standard position by repeating trial-and-error placement over again. This technique needs a lot of time in order to recognize an actual position of an object. Further, since it is generally difficult to find a position where two images overlap each other exactly, it is usual to regard an image of an object as being overlapped on and in conformity with the standard image when the object image has been substantially overlapped on the standard image and terminate translation and/or rotation of the object image. This leads to an irregularity in the preciseness of image contour conformity.

Another problem of the prior art technique is that if an object has no distinctive points, such as edges or corners of a contour, it is difficult to determine the position of the object. Further, with the prior art technique, it takes a long time to find a position in which distinctive points of the object virtually located in the predetermined standard position are accurately coincident in position with those of an image of the object in a specific position, resulting in difficulty in accurate measurement of deviations in parallel translation and/or angular rotation of the object with respect to the standard position.

SUMMARY OF THE INVENTION

It is an object of the present invention to provide a method of and an apparatus for determining the three-dimensional position of an object in which it is not necessary to find a position in which two object image are coincident in position with each other.

It is another object of the present invention to provide a method of and an apparatus for determining the three-dimensional position of an object which determines a position of an object which has no distinctive points in its shape.

The present invention provides a method of determining the three-dimensional position of an object in a specific position, such as a measuring position, with respect to a predetermined standard position, defined in three-dimensional co-ordinate system, which includes formularizing a relation between the specific position and the standard position with respect to a standard three-dimensional co-ordinate system as an equation including a positional deviation of the object located in the specific position with respect to the standard position as an unknown parameter and determining a restrictive condition for the position of a distinctive part of the object located in the specific position. By solving the equation under a condition in which the position of the distinctive part in the specific position satisfies the restrictive condition, the positional deviation is found.

The distinctive part is preferably a plurality of, or not less than three, points on a contour line of the object, or the contour line itself, or otherwise a surface of the object.

According to a preferred embodiment of the present invention, the method of determining the three-dimensional position of an object in a specific position, such as a measuring position, with respect to a predetermined standard position includes establishing an evaluation function for providing a sum of the shortest distances between a plurality of, i.e. not less than three, and preferably more than six, sight lines of a camera intersecting a distinctive line of the object located in the specific position and the distinctive line of the object located in any position and deriving co-ordinates of the object as the specific position which converges the evaluation function to approximately zero (0). A distance of a position expressed by the co-ordinate from a standard position defined in a standard three-dimensional co-ordinate system is calculated as a deviation of the object.

In another preferred embodiment of the present invention, the method of determining the three-dimensional position of an object in a specific position, such as a measuring position, with respect to a predetermined standard position includes retrieving standard co-ordinates of distinctive points on a contour line of the object expressed as a three-dimensional line defined by unknown parameters with respect to a position of the object virtually located in a predetermined standard position, and detecting co-ordinates of the distinctive points on the contour line of the object located in the specific position. The co-ordinates of the distinctive points on the contour line of the object in either the specific position or the standard position are transformed by use of unknown parameters representing positional deviation. A relation between the specific and standard positions is formularized as a nonlinear equation including the parameters under a restrictive condition such that vectors of a sight line intersecting each distinctive point having the transformed co-ordinates and a vector of a sight line intersecting each distinctive point having the co-ordinates of each distinctive point on the contour line of the object in another of said specific position and said standard position are coincident in direction with each other. The equation is solved so as to find the unknown parameters as a positional deviation and angular deviation.

In solving the equation, an initial value is established and used in numerical solution of the nonlinear equation to find the unknown parameters. The contour line is preferred to be detected in different directions.

The present invention further provides an apparatus for determining the three-dimensional position of an object in a specific position, such as a measuring position, with respect to a predetermined standard position which comprises a memory means for storing a position of a distinctive part of the object virtually located in the standard position expressed in a standard three-dimensional co-ordinate system, a formularizing means for formularizing a relation between the specific position and the standard position with respect to the standard three-dimensional co-ordinate system as an equation which includes unknown parameters as a positional deviation of the object in the specific position from the standard position, a condition determination means for determining a restrictive condition for the position of the distinctive part when the object is located in the specific position, and a calculation means for solving the equation under a condition that the position of the distinctive part in the specific position expressed by the equation satisfies the restrictive condition so as thereby to find a positional deviation.

According to a preferred embodiment of the present invention, the condition determination means includes a camera forming an image of the distinctive part which may be comprised by more than three points, or otherwise may be at least part of a contour line of the object and a sight line forming means for forming sight lines of the camera. The position of the object is determined based on co-ordinates of at least three points on the part of the contour line of the object in the specific position which the condition determination means retrieves and is corrected based on co-ordinates of another point on the contour line of the object in the specific position.

In still another preferred embodiment of the present invention, the apparatus for determining the three-dimensional position of an object in a specific position with respect to a predetermined standard position comprises a memory means for storing a position of a distinctive line included in the object virtually located in the standard position which is expressed in a standard three-dimensional co-ordinate system, a sight line forming means for forming more than three sight lines of a camera which intersect the distinctive line of the object in the specific position, a function establishing means for establishing an evaluation function for providing a sum of the shortest distances between the sight lines and the distinctive line of the object located in any position, a co-ordinate deriving means for deriving co-ordinates of the object as the specific position which converges the evaluation function to approximately zero (0), and a calculation means for calculating a distance of a position expressed by the co-ordinate from the standard position as a deviation of the object.

In a further preferred embodiment of the present invention, the apparatus for determining a three-dimensional relative position of an object in a specific position with respect to a predetermined standard position comprises a memory means for storing a position of a contour line of the object, virtually located in a predetermined standard position, which is expressed as a three-dimensional line defined by parameters, a first data retrieving means for retrieving standard co-ordinates of distinctive points on the contour line of the object virtually located in the predetermined standard position, an object detecting means for detecting the object in a specific position, a second data retrieving means for retrieving co-ordinates of the distinctive points on the contour line of the object located in the specific position, a data transforming means for transforming the co-ordinates of the distinctive points on the contour line of the object in either one of the specific position and the standard position by use of parameters representing unknown positional deviation and unknown angular deviation, a vector establishing means for establishing vectors of a sight line intersecting each of the distinctive point having the transformed co-ordinates and a vector of a sight line intersecting each the distinctive point having the co-ordinates of each the distinctive point on the contour line of the object in another of the specific position and the standard position, a formularizing means for formularizing a relation between the specific position and the standard position including the parameters as a nonlinear equation under a restrictive condition that the vectors are coincident in direction with each other, and an equation solving means for solving the equation so as to find the unknown parameters as the positional deviation and unknown angular deviation.

In the present invention, using co-ordinates $(x_R, y_R, z_R, 1)^T$ for one of the distinctive points of an object in a specific three-dimensional position and co-ordinates $(x_C, y_C, z_C, 1)^T$ for the distinctive point in a standard three-dimensional position (which is known), the line of sight, which refers to a line connecting a picture element of an image corresponding to the distinctive point and the center of a camera lens, is expressed as an intersecting line between two planes and may be found by the following sight line equations:

$$a_1 x + b_1 y + c_1 z + d_1 = 0 \quad (1)$$

$$a_2 x + b_2 y + c_2 z + d_2 = 0 \quad (2)$$

A positional relation of the distinctive point between the specific and standard positions is given by use of a position matrix $\Delta$ as follows:

$$\Delta = \begin{pmatrix} \Delta c_1 \\ \Delta c_2 \\ \Delta c_3 \end{pmatrix} \quad (3)$$

$$\begin{pmatrix} x_R \\ y_R \\ z_R \\ 1 \end{pmatrix} = \Delta \begin{pmatrix} x_c \\ y_c \\ z_c \\ 1 \end{pmatrix}$$

That is, $$x_R = \Delta_1 \cdot (x_c, y_c, z_c, 1)^T$$

$$y_R = \Delta_2 \cdot (x_c, y_c, z_c, 1)^T \quad (4)$$

$$z_R = \Delta_3 \cdot (x_c, y_c, z_c, 1)^T$$

Since the co-ordinates $(x_R, y_R, z_R, 1)^T$ for the distinctive point in the specific three-dimensional position satisfies the sight line equations (1) and (2):

$$a_1 \cdot \Delta_1 \cdot (x_c, y_c, z_c, 1)^T + b_1 \cdot \Delta_2 \cdot (x_c, y_c, z_c, 1)^T + c_1 \cdot \Delta_3 \cdot (x_c, y_c, z_c, 1)^T + d_1 = 0 \quad (5)$$

$$a_2 \cdot \Delta_1 \cdot (x_c, y_c, z_c, 1)^T + b_2 \cdot \Delta_2 \cdot (x_c, y_c, z_c, 1)^T + c_2 \cdot \Delta_3 \cdot (x_c, y_c, z_c, 1)^T + d_2 = 0 \quad (6)$$

Because the co-ordinates $(x_c, y_c, z_c, 1)^T$ for the distinctive point in the standard three-dimensional position are of known factors, these equations contain positional deviation matrices $\Delta$ as unknown factors.

Basically, as coefficients, $a_1$, $a_2$, $b_1$, $b_2$, $c_1$, $c_2$, $d_1$ and $d_2$, are previously given as invariable, a three-dimensional positional deviation of the object from the standard position is found by obtaining twelve elements, six for rotation and six for parallel translation, of the position matrix $\Delta$. According to the positional deviation thus found, a clear grasp of a current three-dimensional position of the object is known.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

The following description will be directed to a method of position determination used to determine a position of a vehicle body in an automobile production line. In the automobile production line a vehicle body is transported on a motor-driven transportation car in a machining line so as to be machined by, for example, machining robots at several machining stations. Each machining robot must be previously given data on the position of a vehicle body on the transportation car so as to perform properly predetermined machining on the vehicle body. While the machining robot with a teaching function may have various advantages, nevertheless, various constraints must be imposed upon teaching the machining robot the accurate position of a vehicle body on the transportation car in order for the vehicle body to be precisely machined.

On the assumption that a vehicle body is accurately positioned on the transportation car with no positional error, a theoretical position X of a distinctive point of the vehicle body and an actual position X of a distinctive point of the vehicle body are given as follows:

$$\hat{X}=[\hat{x}, \hat{y}, \hat{z}, 1]^T$$

$$X=[x, y, z, 1]^T$$

Figure 1:
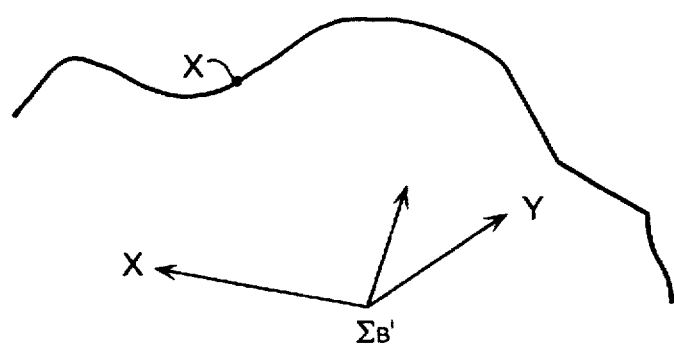
FIG. 1 is an explanatory illustration for describing a principle of a method of measuring a positional deviation in accordance with a preferred embodiment of the present invention.
Figure 1:
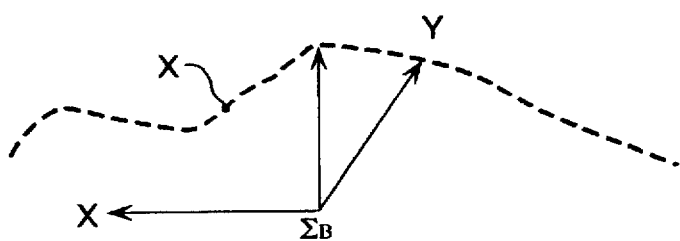
Figure 1:
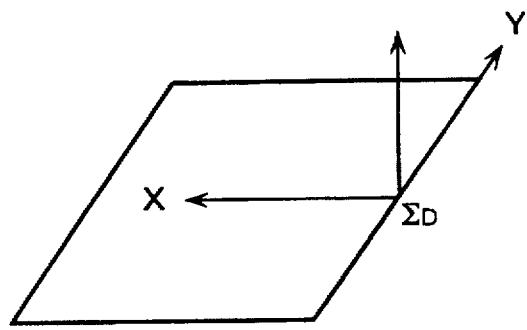
Figure 1:
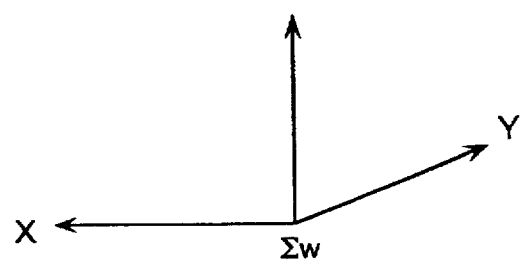
Figure 2:
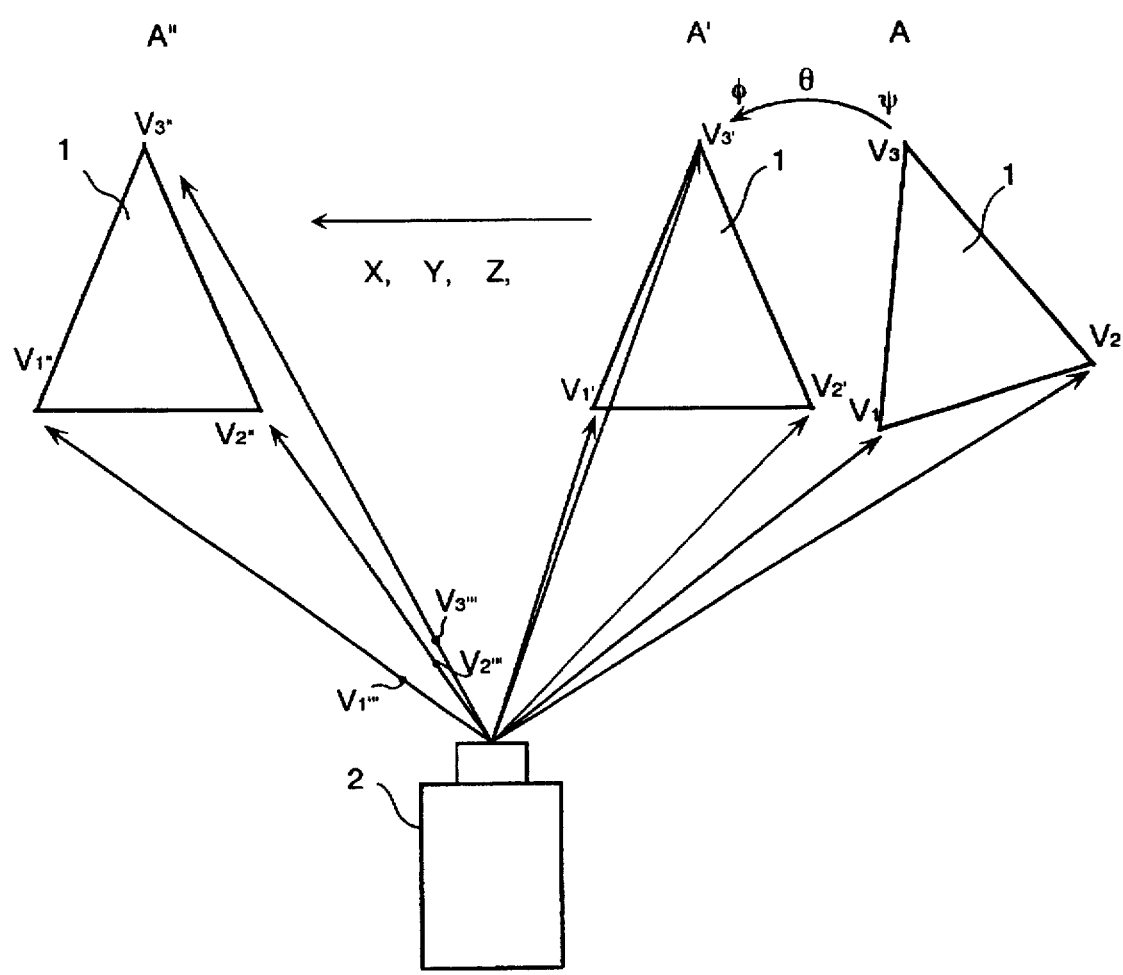
FIG. 2 is an explanatory illustration for describing a principle of a method of measuring a positional deviation in accordance with another preferred embodiment of the present invention.

Referring to FIG. 1, which is an illustration explaining the principle of positional deviation measuring, the following co-ordinate systems are used to represent these theoretical or standard and actual or measuring positions:

$\Sigma_W$ is a global co-ordinate system;

$\Sigma_D$ is a co-ordinate system for the transportation car;

$\Sigma_B$ is a co-ordinate system for the theoretical position; and $\Sigma_{B'}$ is a co-ordinate system for the theoretical position.

In FIG. 1, the relationship is given between the standard and measuring positions by the following equation:

$$^{B'}X = {}^B\hat{X} \tag{7}$$

This equation (7) is rewritten by means of co-ordinate transformation as follows:

$$^B X = {}^B T_{B'} \cdot {}^{B'}X \tag{8}$$

Then, the following equation is obtained on referring to equations (7) and (8):

$$^B X = {}^B T_{B'} \cdot {}^B \hat{X}$$

Here, the following equation is derived by multiplying both members by $^W T_D \cdot {}^D T_B$ in order to reflect the relation of a position of the transportation car relative to the global co-ordinate system and the relation of the theoretical position co-ordinate system relative to the transportation car co-ordinate system:

$$^W X = {}^W T_D \cdot {}^D T_B \cdot {}^B T_{B'} \cdot {}^B \hat{X} \tag{9}$$

where T is a homogeneous transformation matrix:

$^W X$ is co-ordinates of the distinctive point of the vehicle body as viewed from the global co-ordinate system; and $^B X$ is CAD data.

In the equation (9) the values of $^W T_D \cdot {}^D T_B \cdot {}^B T_{B'}$, $^D T_B \cdot {}^B T_{B'}$ and $^B T_{B'}$ are considered as a positional error relative to the global co-ordinate system, the transportation car and the theoretical position, respectively. The positional error, based on which the vehicle body position data that the machining robot has been taught is corrected, is known by finding the unknown matrix of $^B T_{B'}$ in a following manner described hereafter.

A point seen by a camera whose co-ordinates are known in the global co-ordinate system has co-ordinates (i, j), it should be on a line as an intersection of two planes expressed by the following equations:

$$\begin{cases} V_{xi} \cdot x + V_{yi} \cdot y + V_{zi} \cdot z + V_{ci} = 0 \\ H_{xi} \cdot x + H_{yi} \cdot y + H_{zi} \cdot z + H_{ci} = 0 \end{cases}$$

These equations are transformed as follows:

$$\begin{bmatrix} V_{xi} & V_{xi} & V_{xi} & V_{xi} \\ V_{xi} & V_{xi} & V_{xi} & V_{xi} \end{bmatrix} \begin{bmatrix} x \\ y \\ z \\ 1 \end{bmatrix} \quad (10)$$

$${}^{w}C \cdot {}^{w}X = 0$$

where C is the calibration data.

The following equation is obtained from the equations (9) and (10):

$${}^{w}C \cdot {}^{w}T_D \cdot {}^{D}T_B \cdot {}^{B}T_{B'} \cdot {}^{B'}X = 0 \quad (11)$$

Accordingly, two equations can be obtained for each distinctive point. If the co-ordinate systems $\Sigma_W$, $\Sigma_B$ and $\Sigma_{B'}$ coincide with one another, the following equation is established:

$${}^{w}C \cdot {}^{w}T_{B'} \cdot {}^{w}X = 0 \quad (12)$$

When measurements are made for a number of "n" of distinctive points, the following a number of "2n" of equations are obtained as follows:

$$\begin{bmatrix} {}^{w}C_1 \cdot {}^{w}T_{B'} \cdot {}^{w}\hat{X}_1 &=& 0 \\ {}^{w}C_2 \cdot {}^{w}T_{B'} \cdot {}^{w}\hat{X}_2 &=& 0 \\ & \vdots & \\ {}^{w}C_n \cdot {}^{w}T_{B'} \cdot {}^{w}\hat{X}_n &=& 0 \end{bmatrix}$$

Expanding the equation (12), $$\begin{bmatrix} C_{11} & C_{12} & C_{13} & | & C_{14} \\ C_{21} & C_{22} & C_{23} & | & C_{24} \end{bmatrix} \begin{bmatrix} T_{11} & T_{12} & T_{13} & | & T_{14} \\ T_{21} & T_{22} & T_{23} & | & T_{24} \\ T_{31} & T_{32} & T_{33} & | & T_{34} \\ \hline 0 & 0 & 0 & | & 1 \end{bmatrix} \begin{bmatrix} x \\ y \\ z \\ 1 \end{bmatrix} = 0$$

$$\begin{bmatrix} C_V' & | & C_{14} \\ \hline C_H' & | & C_{24} \end{bmatrix} \begin{bmatrix} R \cdot r + P \\ 1 \end{bmatrix} = 0$$

where $$R = \begin{bmatrix} T_{11} & T_{12} & T_{13} \\ T_{21} & T_{22} & T_{23} \\ T_{31} & T_{32} & T_{33} \end{bmatrix}$$

$$P = \begin{bmatrix} T_{14} \\ T_{24} \\ T_{34} \end{bmatrix}$$

$$r = \begin{bmatrix} x \\ y \\ z \end{bmatrix}$$

$$C_V = \begin{bmatrix} C_{11} \\ C_{12} \\ C_{13} \end{bmatrix}^T$$

$$C_H = \begin{bmatrix} C_{21} \\ C_{22} \\ C_{23} \end{bmatrix}^T$$

$$\begin{bmatrix} C_V \cdot R \cdot r + C_V \cdot P + C_{14} \\ C_H \cdot R \cdot r + C_H \cdot P + C_{24} \end{bmatrix} = 0$$

That is:

$$\begin{bmatrix} C_{11}\hat{x}C_{11}\hat{y}C_{11}\hat{z}C_{11} & C_{12}\hat{x}C_{12}\hat{y}C_{12}\hat{z}C_{12} & C_{13}\hat{x}C_{13}\hat{y}C_{13}\hat{z}C_{13} \\ C_{21}\hat{x}C_{21}\hat{y}C_{21}\hat{z}C_{21} & C_{22}\hat{x}C_{22}\hat{y}C_{22}\hat{z}C_{22} & C_{23}\hat{x}C_{23}\hat{y}C_{23}\hat{z}C_{23} \end{bmatrix} \begin{bmatrix} T_{11} \\ T_{12} \\ T_{13} \\ T_{14} \\ T_{21} \\ T_{22} \\ T_{23} \\ T_{24} \\ T_{31} \\ T_{32} \\ T_{33} \\ T_{34} \end{bmatrix} = \begin{bmatrix} -C_{14} \\ -C_{14} \end{bmatrix}$$

When measurement has been made for "n" distinctive points, the following matrix (13) is obtained:

$$n=1 \begin{bmatrix} C_{11}\hat{x}_1 & C_{11}\hat{y}_1 & C_{11}\hat{z}_1 & C_{11} & C_{12}\hat{x}_1 & C_{12}\hat{y}_1 & C_{12}\hat{z}_1 & C_{12} & C_{13}\hat{x}_1 & C_{13}\hat{y}_1 & C_{13}\hat{z}_1 & C_{13} \\ C_{21}\hat{x}_1 & C_{21}\hat{y}_1 & C_{21}\hat{z}_1 & C_{21} & C_{22}\hat{x}_1 & C_{22}\hat{y}_1 & C_{22}\hat{z}_1 & C_{22} & C_{23}\hat{x}_1 & C_{23}\hat{y}_1 & C_{23}\hat{z}_1 & C_{23} \\ \vdots & & & & \vdots & & & & \vdots & & & \\ C_{11}\hat{x}_n & C_{11}\hat{y}_n & C_{11}\hat{z}_n & C_{11} & C_{12}\hat{x}_n & C_{12}\hat{y}_n & C_{12}\hat{z}_n & C_{12} & C_{13}\hat{x}_n & C_{13}\hat{y}_n & C_{13}\hat{z}_n & C_{13} \\ C_{21}\hat{x}_n & C_{21}\hat{y}_n & C_{21}\hat{z}_n & C_{21} & C_{22}\hat{x}_n & C_{22}\hat{y}_n & C_{22}\hat{z}_n & C_{22} & C_{23}\hat{x}_n & C_{23}\hat{y}_n & C_{23}\hat{z}_n & C_{23} \end{bmatrix} \begin{bmatrix} T_{11} \\ T_{12} \\ T_{13} \\ \vdots \\ T_{33} \\ T_{34} \end{bmatrix} = \begin{bmatrix} -C_{14} \\ -C_{24} \\ -C_{14} \\ \vdots \\ -C_{24} \end{bmatrix}$$

$$A = \begin{bmatrix} C_{11}\hat{x}_1 & C_{11}\hat{y}_1 & C_{11}\hat{z}_1 & C_{11} & C_{12}\hat{x}_1 & C_{12}\hat{y}_1 & C_{12}\hat{z}_1 & C_{12} & C_{13}\hat{x}_1 & C_{13}\hat{y}_1 & C_{13}\hat{z}_1 & C_{13} \\ C_{21}\hat{x}_1 & C_{21}\hat{y}_1 & C_{21}\hat{z}_1 & C_{21} & C_{22}\hat{x}_1 & C_{22}\hat{y}_1 & C_{22}\hat{z}_1 & C_{22} & C_{23}\hat{x}_1 & C_{23}\hat{y}_1 & C_{23}\hat{z}_1 & C_{23} \\ \vdots & & & & \vdots & & & & \vdots & & & \\ C_{11}\hat{x}_n & C_{11}\hat{y}_n & C_{11}\hat{z}_n & C_{11} & C_{12}\hat{x}_n & C_{12}\hat{y}_n & C_{12}\hat{z}_n & C_{12} & C_{13}\hat{x}_n & C_{13}\hat{y}_n & C_{13}\hat{z}_n & C_{13} \\ C_{21}\hat{x}_n & C_{21}\hat{y}_n & C_{21}\hat{z}_n & C_{21} & C_{22}\hat{x}_n & C_{22}\hat{y}_n & C_{22}\hat{z}_n & C_{22} & C_{23}\hat{x}_n & C_{23}\hat{y}_n & C_{23}\hat{z}_n & C_{23} \end{bmatrix}$$

$$t = \begin{bmatrix} T_{11} \\ T_{12} \\ T_{13} \\ \vdots \\ T_{33} \\ T_{34} \end{bmatrix}$$

$$B = \begin{bmatrix} -C_{14} \\ -C_{24} \\ -C_{14} \\ \vdots \\ \vdots \\ \vdots \\ \vdots \\ \vdots \\ -C_{24} \end{bmatrix}$$

Finally, the following equation is obtained:

$$A \cdot t = B$$

By the least squares method $$A^t \cdot A \cdot t = A^t \cdot B \therefore t = (A^t \cdot A)^{-1} \cdot A^t \cdot B$$

Since A and B are known from calibration data and measured data, the matrix t is obtained from the equation (13).

Because the matrix t represents rotated positional deviation and parallel positional deviation between standard and measuring positions of the vehicle body, the measuring position is accurately calculated by obtaining all of the elements of the matrix t. By correcting the operation data having been taught the machining robot based on this measuring position, the machining robot performs precisely machining on the vehicle body in spite of a positional error of the vehicle body on the transportation car.

As the matrix includes twelve unknowns, when a linear calculation is made, the matrix t is solved by use of data of at least six distinctive points. In particular, if there is obtained data of more than six distinctive points, the matrix t is solved by the least squares method, providing an increase in accuracy.

A method of determining three dimensional position in accordance with another preferred embodiment of the present invention will be hereafter described.

Using C, r, r, and v for a camera position, a theoretical position of a distinctive point of the vehicle body, an actual position X of the distinctive point, and a vector of the line of sight, respectively, and expressing them as follows:

$$C = (C_1, C_2, C_3)^T$$

$$r = (\hat{x}, \hat{y}, \hat{z})^T$$

$$r = (x, y, z)^T$$

$$v = (v_1, v_2, v_3)^T$$

a homogeneous transformation matrix T is formularized as follows:

$$T \cdot r = r$$

If a distinctive point is on the line of sight the following equation holds:

$$(r - C) \times v = |r - C| \cdot |v|$$

$$(T \cdot \hat{r} - C) \times v = |r - C| \cdot |v|$$

After all, these equations are transformed as follows:

$$v_1(T_{11}\hat{x} + T_{12}\hat{y} + T_{13}\hat{z} + T_{14} - C_1) + v_2(T_{21}\hat{x} + T_{22}\hat{y} +$$

$$T_{23}\hat{z} + T_{24} - C_2) + v_3(T_{31}\hat{x} + T_{32}\hat{y} + T_{33}\hat{z} +$$

$$T_{34} - C_3) = (v_1^2 + v_2^2 + v_3^2)^{1/2} \cdot \{(T_{11}\hat{x} + T_{12}\hat{y} + T_{13}\hat{z} +$$

$$T_{14} - C_1)^2 + (T_{21}\hat{x} + T_{22}\hat{y} + T_{23}\hat{z} + T_{24} - C_2)^2 +$$

$$(T_{21}\hat{x} + T_{22}\hat{y} + T_{23}\hat{z} + T_{24} - C_2)\}^{1/2}$$

The above expression is rearranged for the respective points as follows:

$$v_1(T_{21}\hat{x} + T_{22}\hat{y} + T_{23}\hat{z} + T_{24} - C_2) -$$

$$v_2(T_{11}\hat{x} + T_{12}\hat{y} + T_{13}\hat{z} + T_{14} - C_1) = 0$$

$$v_2(T_{31}\hat{x} + T_{32}\hat{y} + T_{33}\hat{z} + T_{34} - C_3) -$$

$$v_3(T_{21}\hat{x} + T_{22}\hat{y} + T_{23}\hat{z} + T_{24} - C_2) = 0$$

$$v_3(T_{11}\hat{x} + T_{12}\hat{y} + T_{13}\hat{z} + T_{14} - C_1)^2$$

Accordingly, the following equation is obtained:

$$\begin{bmatrix} v_2\hat{x} & -v_2\hat{y} & -v_2\hat{z} & -v_2 & v_1\hat{x} & -v_1\hat{y} & -v_1\hat{z} & -v_1 & 0 & 0 & 0 & 0 \\ 0 & 0 & 0 & 0 & -v_3\hat{x} & -v_3\hat{y} & -v_3\hat{z} & -v_3 & v_2\hat{x} & -v_2\hat{y} & -v_2\hat{z} & -v_2 \end{bmatrix} \begin{bmatrix} T_{11} \\ T_{12} \\ \vdots \\ T_{14} \\ T_{21} \\ T_{22} \\ \vdots \\ T_{23} \\ T_{24} \\ T_{31} \\ \vdots \\ T_{32} \\ T_{33} \\ T_{34} \\ \vdots \end{bmatrix} = \begin{bmatrix} v_1C_2 & v_2C_1 \\ v_2C_3 & -v_3C_2 \end{bmatrix}$$

In the similar manner, a positional deviation of the vehicle body can be found from the matrices $[T_{11} \ldots T_{34}]^T$ which can be obtained by solving the above equation.

A method of determining three dimensional position in accordance with still another preferred embodiment of the present invention will be hereafter described.

Because, in the first embodiment, the three distinctive points satisfy an equation for a line of sight that connects a center of the camera and a picture element on an image surface, the six equations can be obtained from the following matrix representation $$n=1 \begin{Bmatrix} \begin{bmatrix} C_{11}x_1 & C_{11}y_1 & C_{11}z_1 & C_{11} & C_{12}x_1 & C_{12}y_1 & C_{12}z_1 & C_{12} & C_{13}x_1 & C_{13}y_1 & C_{13}z_1 & C_{13} \\ C_{21}x_1 & C_{21}y_1 & C_{21}z_1 & C_{21} & C_{22}x_1 & C_{22}y_1 & C_{22}z_1 & C_{22} & C_{23}x_1 & C_{23}y_1 & C_{23}z_1 & C_{23} \\ \vdots & & & & & & & & & & & \vdots \end{bmatrix} \end{Bmatrix} \begin{bmatrix} T_{11} \\ T_{12} \\ T_{13} \\ \vdots \\ T_{23} \\ T_{34} \end{bmatrix} = \begin{bmatrix} -C_{14} \\ -C_{24} \\ -C_{14} \\ \vdots \\ -C_{24} \end{bmatrix}$$

$$R = \begin{pmatrix} T_{11} & T_{12} & T_{13} \\ T_{21} & T_{22} & T_{23} \\ T_{31} & T_{32} & T_{33} \end{pmatrix}$$

Here, since an orthogonal relation, $^tR \cdot R = E$, holds, the following twelve equations are given:

By use of the six equations and six formulas R as to a part of the homogeneous transformation matrix T relating to rotated positional deviation, the matrices $T_{11} \ldots T_{34}$ are solved by Newton-Raphson method. The formula R is expressed as follows:

$$\begin{cases} T_{11}^2 \ T_{12}^2 \ T_{13}^2 = 1 \\ T_{21}^2 \ T_{22}^2 \ T_{23}^2 = 1 \\ T_{31}^2 \ T_{32}^2 \ T_{33}^2 = 1 \end{cases}$$

$$\begin{cases} T_{11} \cdot T_{21} + T_{12} \cdot T_{22} + T_{13} \cdot T_{23} = 0 \\ T_{21} \cdot T_{31} + T_{22} \cdot T_{32} + T_{23} \cdot T_{33} = 0 \\ T_{31} \cdot T_{11} + T_{32} \cdot T_{12} + T_{33} \cdot T_{13} = 0 \end{cases}$$

In a similar manner, a positional deviation of the vehicle body can be found from the matrices $[T_{11} \ldots T_{34}]^T$ which can be obtained by solving the above twelve equations. In other words, in the same manner as the previous embodiment, the homogeneous transformation matrix R can be solved so as to calculate positional deviation. The above-described manner is utilized when the number of distinctive points is six or less than six.

Whereas, the above description has been directed to the case where a single camera is used, nevertheless, a plurality of cameras may be used. In such a case, the relative position among the cameras can be known by calibrating positions of the respective cameras.

The method of determining positional deviation will be hereafter proved by use of a cube as a model.

Figure 4:
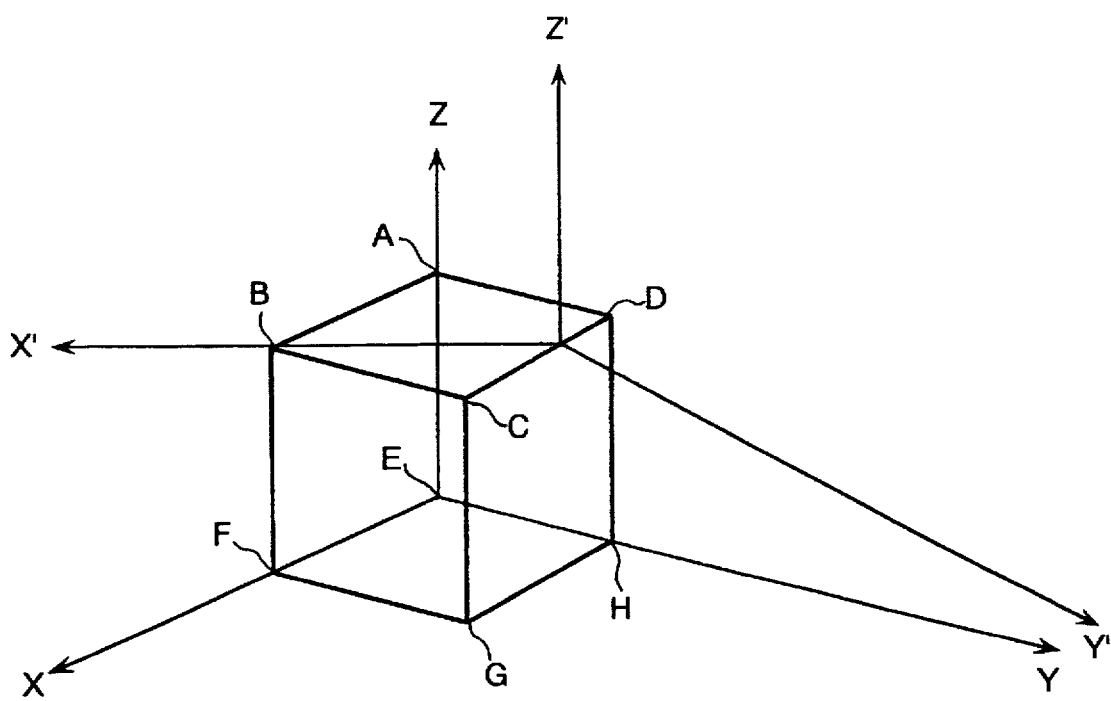
FIG. 4 is an illustration showing a model for verification.

Referring to FIG. 4, vectors of co-ordinates $^B r$ (CAD data) are expressed for distinctive points, such as apices (A–H), of the cube having an equal side of 100 mm placed in a standard or theoretical position as follows:

$$A = \begin{pmatrix} 0 \\ 0 \\ 100 \end{pmatrix} \quad B = \begin{pmatrix} 100 \\ 0 \\ 100 \end{pmatrix} \quad C = \begin{pmatrix} 100 \\ 100 \\ 100 \end{pmatrix}$$

$$D = \begin{pmatrix} 0 \\ 100 \\ 100 \end{pmatrix} \quad E = \begin{pmatrix} 0 \\ 0 \\ 0 \end{pmatrix} \quad F = \begin{pmatrix} 100 \\ 0 \\ 0 \end{pmatrix}$$

$$G = \begin{pmatrix} 100 \\ 100 \\ 0 \end{pmatrix} \quad H = \begin{pmatrix} 0 \\ 100 \\ 0 \end{pmatrix}$$

When letting a positional error matrix $^B T_{B'}$ be as follows:

$$^B T_{B'} = \begin{bmatrix} 0.92 & -0.16 & 0.34 & 10 \\ 0.31 & 0.82 & -0.46 & 20 \\ -0.20 & 0.34 & 0.81 & 30 \\ 0 & 0 & 0 & 1 \end{bmatrix}$$

Since in the specific position co-ordinate system $^B r'$, an equation $r_B' = {}^B T_{B'} \cdot {}^B r$ holds, vectors of co-ordinates, $^B r'$ are expressed for the distinctive points, or the apices (A–H), of the cube having an equal side of 100 mm placed in a specific position as follows:

$$A' = \begin{pmatrix} 44.20 \\ -26.98 \\ 111.37 \end{pmatrix} \quad B' = \begin{pmatrix} 136.74 \\ 4.89 \\ 90.89 \end{pmatrix} \quad C' = \begin{pmatrix} 120.42 \\ 87.21 \\ 145.27 \end{pmatrix}$$

$$D' = \begin{pmatrix} 27.88 \\ 55.33 \\ 165.76 \end{pmatrix} \quad E' = \begin{pmatrix} 10.00 \\ 20.00 \\ 30.00 \end{pmatrix} \quad F' = \begin{pmatrix} 102.54 \\ 51.87 \\ 9.51 \end{pmatrix}$$

$$G' = \begin{pmatrix} 86.22 \\ 134.19 \\ 63.89 \end{pmatrix} \quad H' = \begin{pmatrix} -6.31 \\ 102.31 \\ 84.38 \end{pmatrix}$$

Vectors of camera position with regard to the distinctive points, or the apices (A–H), are as follows:

$$A = \begin{pmatrix} 500 \\ 100 \\ 500 \\ 1 \end{pmatrix} \quad B = \begin{pmatrix} 500 \\ 100 \\ 500 \\ 1 \end{pmatrix} \quad C = \begin{pmatrix} 500 \\ 500 \\ 500 \\ 1 \end{pmatrix}$$

$$D = \begin{pmatrix} 100 \\ 500 \\ 500 \\ 1 \end{pmatrix} \quad E = \begin{pmatrix} 100 \\ 500 \\ 500 \\ 1 \end{pmatrix} \quad F = \begin{pmatrix} 500 \\ 100 \\ 500 \\ 1 \end{pmatrix}$$

$$G = \begin{pmatrix} 500 \\ 500 \\ 500 \\ 1 \end{pmatrix} \quad H = \begin{pmatrix} 100 \\ 500 \\ 500 \\ 1 \end{pmatrix}$$

The equations of the line of sight for the respective distinctive points, or the apices (A–H), from the camera are given as follows:

$$\begin{cases} ax + by + cz + d = 0 \\ ex + fy + gz + h = 0 \end{cases}$$

where the respective coefficients, or invariables, a, b, c, d, e, f, g and h, which are determined by camera parameters and picture element values, are given for the respective distinctive points, or the apices (A–H), as follows:

|   | n = 1 (A) | n = 2 (B) | n = 3 (C) | n = 4 (D) |
|---|---|---|---|---|
| a | −126.98 | −95.10 | −412.78 | −444.66 |
| b | 455.79 | 363.25 | 379.57 | 72.11 |
| c | 0 | 0 | 0 | 0 |
| d | 17912.51 | 11226.89 | 16606.91 | 8408.94 |
| e | 0 | 0 | 0 | 0 |
| f | −388.62 | −409.10 | −354.72 | −334.23 |
| g | 126.98 | 95.10 | 412.78 | 444.66 |
| h | −24630.29 | −6641.76 | −29031.96 | −55215.45 |

|   | n = 1 (E) | n = 2 (F) | n = 3 (G) | n = 4 (H) |
|---|---|---|---|---|
| a | −480.00 | −48.12 | −365.80 | −397.68 |
| b | 90.00 | 397.45 | 413.77 | 106.31 |
| c | 0 | 0 | 0 | 0 |
| d | 3000.00 | −15685.62 | −23986.40 | −13390.52 |
| e | 0 | 0 | 0 | 0 |
| f | −470.00 | −490.48 | −436.10 | −415.61 |
| g | 480.00 | 48.12 | 365.80 | 397.68 |
| h | −5000.00 | 24988.53 | 35150.23 | 8966.74 |

$$A = \begin{pmatrix} 0 & 0 & -12698.46 & -126.98 & 0 & 0 \\ 0 & 0 & 0 & 8 & 0 & 0 \\ -9510.50 & 0 & -9510.50 & -95.10 & 36325.63 & 0 \\ 0 & 0 & 0 & 0 & -40910.76 & 0 \\ -41278.77 & -41278.77 & -41278.77 & -412.78 & 37957.39 & 39757.39 \\ 0 & 0 & 0 & 0 & -35472.38 & -35472.38 \\ 0 & -44466.73 & -44466.73 & -444.66 & 0 & 7211.55 \\ 0 & 0 & 0 & 0 & 0 & -33423.64 \\ 0 & 0 & 0 & -480.00 & 0 & 0 \\ 0 & 0 & 0 & 0 & 0 & 0 \\ -4812.04 & 0 & 0 & -48.12 & -39745.83 & 0 \\ 0 & 0 & 0 & 0 & -49048.74 & 0 \\ -36580.31 & -36580.31 & 0 & -365.80 & 41377.59 & 41377.59 \\ 0 & 0 & 0 & 0 & -43610.35 & -43610.35 \\ 0 & -39768.27 & 0 & -397.68 & 0 & 10631.75 \\ 0 & 0 & 0 & 0 & 0 & -41561.61 \end{pmatrix}$$

-continued $$\begin{pmatrix} 45579.79 & 455.79 & 0 & 0 & 0 & 0 \\ -38862.02 & -388.62 & 0 & 0 & 12698.46 & 126.98 \\ 36325.63 & 363.25 & 0 & 0 & 0 & 0 \\ -40910.76 & -409.10 & 9510.50 & 0 & 9510.50 & 95.10 \\ 37957.39 & 379.57 & 0 & 0 & 0 & 0 \\ -35472.38 & -354.72 & 41278.77 & 41278.77 & 41278.77 & 412.78 \\ 7211.55 & 72.11 & 0 & 0 & 0 & 0 \\ -33423.64 & -334.23 & 0 & 44466.73 & 44466.73 & 444.66 \\ 0 & 90 & 0 & 0 & 0 & 0 \\ 0 & -470 & 0 & 0 & 0 & 480 \\ 0 & 397.45 & 0 & 0 & 0 & 0 \\ 0 & -490.48 & 4812.04 & 0 & 0 & 48.12 \\ 0 & 413.77 & 0 & 0 & 0 & 0 \\ 0 & -436.10 & 36580.31 & 36580.31 & 0 & 365.80 \\ 0 & 106.31 & 0 & 0 & 0 & 0 \\ 0 & -415.61 & 0 & 39768.27 & 0 & 397.68 \end{pmatrix}$$

Further, in the present embodiment, the vector B is given as follows:

$$B = \begin{pmatrix} -17912.51 \\ 24630.29 \\ -11226.89 \\ 6641.76 \\ -16606.91 \\ 29031.96 \\ -8408.94 \\ 55215.45 \\ -3000 \\ 5000 \\ 15685.62 \\ -24988.53 \\ 23956.40 \\ -35150.23 \\ 13390.32 \\ -8966.74 \end{pmatrix}$$

$${}^tA \cdot A = \begin{pmatrix} 3.16E+09 & 3.04E+09 & 1.79E+09 & 31556620 & 3.62E+09 & -3.08E+09 \\ 3.04E+09 & 6.60E+09 & 3.68E+09 & 66008623 & -3.08E+09 & -3.82E+09 \\ 1.79E+09 & 3.68E+09 & 3.93E+09 & 39329284 & -1.91E+09 & -1.89E+09 \\ 31556620 & 66008623 & 39329284 & 917971.87 & -36171737 & -38239210 \\ -3.62E+09 & -3.08E+09 & -1.91E+09 & -36171737 & 1.33E+10 & 6.31E+09 \\ -3.08E+09 & -3.82E+09 & -1.89E+09 & -38239210 & 6.31E+09 & 9.32E+09 \\ -1.91E+09 & -1.89E+09 & -2.81E+09 & -28117776 & 5.69E+09 & 3.87E+09 \\ -36171737 & -38239210 & -28117776 & -537144.8 & 132917748 & 93225711 \\ 0 & 0 & 0 & 0 & -3.68E+09 & -3.06E+09 \\ 0 & 0 & 0 & 0 & -3.06E+09 & -6.20E+09 \\ 0 & 0 & 0 & 0 & -1.85E+09 & -2.95E+09 \\ 0 & 0 & 0 & 0 & -36846238 & -61986110 \end{pmatrix}$$

$$\begin{pmatrix} -1.91E+09 & -36171737 & 0 & 0 & 0 & 0 \\ -1.89E+09 & -38239210 & 0 & 0 & 0 & 0 \\ -2.81E+09 & -28117776 & 0 & 0 & 0 & 0 \\ -28117776 & -537144.8 & 0 & 0 & 0 & 0 \\ 5.69E+09 & 132917748 & -3.68E+09 & -3.06E+09 & -1.85E+09 & -36846438 \\ 3.87E+09 & 93225711 & -3.06E+09 & -6.20E+09 & -2.95E+09 & -61986110 \\ 1.04E+10 & 104492170 & -1.85E+09 & -2.95E+09 & -3.83E+09 & -38330667 \\ 104492170 & 2217909.8 & -36846438 & -61986110 & -38330667 & -957320.5 \\ -1.85E+09 & -36846438 & 3.16E+09 & 3.04E+09 & 1.79E+09 & 31556620 \\ -2.95E+09 & -61986110 & 3.04E+09 & 6.60E+09 & 3.68E+09 & 66008623 \\ -3.83E+09 & -38330667 & 1.79E+09 & 3.68E+09 & 3.93E+09 & 39329284 \\ -38330667 & -957320.5 & 31556620 & 66008623 & 39329284 & 917971.87 \end{pmatrix}$$

$$({}^tA \cdot A)^{-1} = \begin{pmatrix} 0.00 & 0.00 & -0.00 & -0.00 & 0.00 & 0.00 & 0.00 & -0.00 & 0.00 & 0.00 & -0.00 & -0.00 \\ 0.00 & 0.00 & -0.00 & -0.00 & 0.00 & 0.00 & -5.11 & -0.00 & 0.00 & 0.00 & -0.00 & -0.00 \\ -0.00 & -0.00 & 0.00 & 0.00 & -0.00 & -0.00 & 0.00 & -0.00 & -0.00 & -0.00 & 0.00 & 0.00 \\ -0.00 & -0.00 & 0.00 & 0.00 & -0.00 & -0.00 & 0.00 & -0.00 & -0.00 & -0.00 & 0.00 & 0.00 \\ 0.00 & 0.00 & -0.00 & -0.00 & 0.00 & 0.00 & 0.00 & -0.00 & 0.00 & 0.00 & -0.00 & -0.00 \\ 0.00 & 0.00 & -0.00 & -0.00 & 0.00 & 0.00 & 0.00 & -0.00 & 0.00 & 0.00 & -0.00 & -0.00 \\ 0.00 & -5.11 & 0.00 & -0.00 & 0.00 & 0.00 & -0.00 & 0.00 & 0.00 & 0.00 & -0.00 & 0.00 \\ -0.00 & -0.00 & -0.00 & 0.00 & -0.00 & -0.00 & 0.00 & 0.00 & -0.00 & -0.00 & 0.00 & 0.00 \\ 0.00 & 0.00 & -0.00 & -0.00 & 0.00 & 0.00 & 0.00 & -0.00 & 0.00 & 0.00 & -0.00 & -0.00 \\ 0.00 & 0.00 & -0.00 & -0.00 & 0.00 & 0.00 & 0.00 & -0.00 & 0.00 & 0.00 & -0.00 & -0.00 \\ -0.00 & -0.00 & 0.00 & 0.00 & -0.00 & -0.00 & 0.00 & -0.00 & -0.00 & -0.00 & 0.00 & 0.00 \\ -0.00 & -0.00 & 0.00 & 0.00 & -0.00 & -0.00 & -0.00 & 0.00 & -0.00 & -0.00 & 0.00 & 0.00 \end{pmatrix}$$

Further, $^tAB$ is given as follows:

$$\begin{pmatrix} -1.61E+08 \\ -3.51E+08 \\ 1.39E+09 \\ 522385.08 \\ 2.03E+09 \\ -5.26E+08 \\ -6.02E+09 \\ -13939619 \\ 1.44E+08 \\ 2.01E+09 \\ 4.03E+09 \\ 25069442 \end{pmatrix}$$

Accordingly, the vector t, which stands for $(^tAA)^{-1} \cdot AB$, is given as follows:

$$(^tA \cdot A)^{-1} \cdot AB = \begin{matrix} T_{11} & 0.9254165 \\ T_{12} & -0.163175 \\ T_{13} & 0.3420201 \\ T_{14} & 10 \\ T_{21} & 0.3187957 \\ T_{22} & 0.8231729 \\ T_{23} & -0.469846 \\ T_{24} & 20 \\ T_{31} & -0.204874 \\ T_{32} & 0.5438381 \\ T_{33} & 0.8137976 \\ T_{34} & 30 \end{matrix}$$

A method of determining three dimensional position in accordance with still another preferred embodiment of the present invention will be hereafter described.

Figure 3:
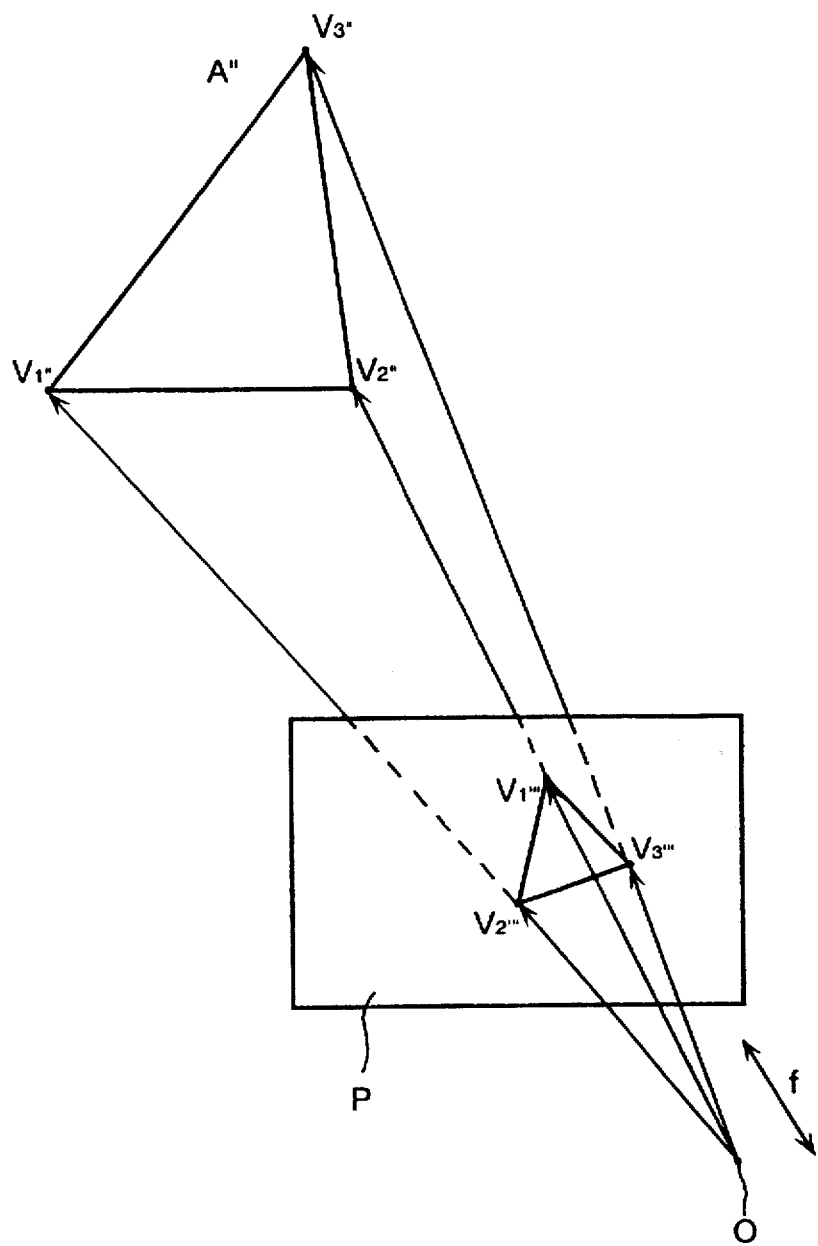
FIG. 3 is an explanatory illustration for describing a principle of a method of measuring a positional deviation in accordance with still another preferred embodiment of the present invention.

Referring to FIG. 3, in which a object 1, such as a vehicle body, is shown to be in the standard position A, since co-ordinates of three distinctive points of the object 1 and the camera 2 are known values, vectors $v_1$–$v_3$ of sight lines, connecting the three distinctive points and the center of a camera lens, are also known. The camera 2 provides a picture containing an image of the object in a specific position A". The following description will be directed to obtaining three-dimensional co-ordinates of the three distinctive points of the object 1 in the specific position A".

A positional deviation of the object 1 between the specific position and the standard position is split into two categories due to rotation and parallel translation. The positional deviation due to parallel translation contains three components x, y and z. Similarly, the positional deviation due to rotation contains three components $\phi$, $\theta$ and $\psi$. In other words, there are six parameters contained in calculation of the transformation of the vectors $v_1$–$v_3$ of sight lines in the specific position A to vectors $v_1"$–$v_3"$ of sight lines in the standard position A". In order to make a calculation of rotation and parallel translation of the object 1 from the specific position A to the standard position A", letting a matrix representation be as follows:

$$\left( \phi, \theta, \psi, \begin{matrix} x \\ y \\ z \end{matrix} \right)$$

the following equations are given:

$$v_1" = \left( \phi, \theta, \psi, \begin{matrix} x \\ y \\ z \end{matrix} \right) \cdot v_1$$

$$v_2" = \left( \phi, \theta, \psi, \begin{matrix} x \\ y \\ z \end{matrix} \right) \cdot v_2$$

$$v_3" = \left( \phi, \theta, \psi, \begin{matrix} x \\ y \\ z \end{matrix} \right) \cdot v_3$$

Although these vectors $v_1"$–$v_3"$ are unknown values, nevertheless, they may be calculated on the image as vectors $v_1'''$–$v_3'''$, which are different only in length from the vectors $v_1"$–$v_3"$. From co-ordinates (x, y) of picture elements corresponding to the three distinctive points in the specific position A" which are found on the image and a distance f defined between the image plane P and the focal point O of the camera which is a known value, the vectors $v_1'''$–$v_3'''$ can be calculated. As each corresponding vectors $v_1"$ and $v_1'''$, $v_2"$ and $v_2'''$, or $v_3"$ and $v_3'''$ are identical in direction with each other, the outer product of each corresponding vector is zero (0).

$$v_1" \cdot v_1''' = 0$$
$$v_2" \cdot v_2''' = 0$$
$$v_3" \cdot v_3''' = 0$$

Substitution of the matrices for the sight lines in the standard position A" into the above vector equations gives $$\left\{ \left( \phi, \theta, \psi, \begin{matrix} x \\ y \\ z \end{matrix} \right) \cdot v_1 \right\} \cdot \sigma_1 \ldots = \vec{0}$$

$$\left\{ \left( \phi, \theta, \psi, \begin{matrix} x \\ y \\ z \end{matrix} \right) \cdot v_2 \right\} \cdot \sigma_1 \ldots = \vec{0}$$

$$\left\{ \left( \phi, \theta, \psi, \begin{matrix} x \\ y \\ z \end{matrix} \right) \cdot v_3 \right\} \cdot \sigma_1 \ldots = \vec{0}$$

Expansion of these vector equations gives six independent equations which contain six unknowns. Because the number of unknowns is equal to the number of equations, these simultaneous equations of six unknowns can be solved.

In the above calculation procedure, considering that the object 1 is shifted to a position A' by means of rotation only, vectors $v_1'$–$v_3'$ of the three distinctive points are expressed as follows:

$$v_1' = (\phi, \theta, \psi) \cdot v_1$$
$$v_2' = (\phi, \theta, \psi) \cdot v_2$$
$$v_3' = (\phi, \theta, \psi) \cdot v_3$$

Since the vector $v_1$ can be represented by a term of $k \cdot v_1'''$ (k is an unknown) and the differences of $(v_2"-v_1")$ and $(v_3"-v_1")$ are equivalent to the differences of $(v_2'-v_1')$ and $(v_3'-v_3')$, respectively.

Rewriting equations, $v_2" \cdot v_2''' = \vec{0}$ and $v_2" \cdot v_2''' = \vec{0}$, by use of the above relations, the following equations should hold:

$$\{k \cdot v_1''' + (\phi, \theta, \psi) \cdot v_2 - (\phi, \theta, \psi) \cdot v_1\} \cdot v_1''' = 0$$

$$\{k \cdot v_1''' + (\phi, \theta, \psi) \cdot v_3 - (\phi, \theta, \psi) \cdot v_1\} \cdot v_3''' = 0$$

Expansion of these vector equations gives four independent equations which contain four unknowns, so that these simultaneous equations of six unknowns can be solved. This calculation procedure can be never be as much as ⅔ times in operation as compared with that of the first embodiment. Once these unknowns $\phi$, $\theta$, $\psi$ and k are determined, the vectors $v_1'$ and $v_1''$ are obtained. By calculating the difference of the vector $v_1''$ from the vector $v_1'$, the components x, y and z of a parallel translation are obtained. Accordingly, all of the factors necessary to represent a three-dimensional positional deviation can be obtained. This three-dimensional positional deviation has been proved to be coincident with an positional error with which the object is positioned on the transportation car. Consequently, by means of the procedure described above, vectors of a positional deviation can be found.

Figure 5:
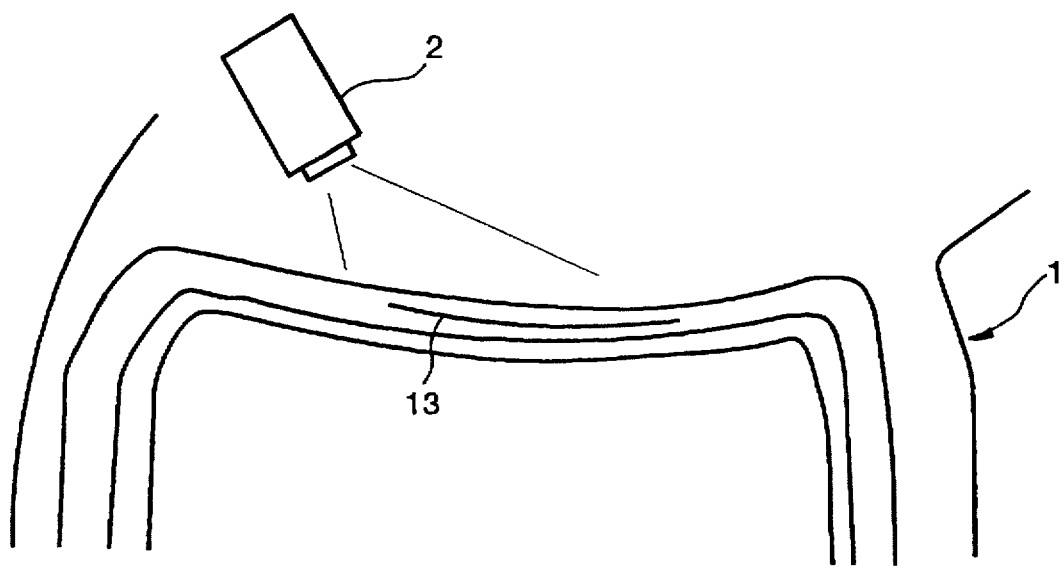
FIG. 5 is a schematic illustration showing a method of measuring a positional deviation in accordance with another preferred embodiment of the present invention.

Referring to FIG. 5, which illustrates a window opening 13 of a vehicle body 1, a positional deviation of the vehicle body 1 is measured by detecting points on an inner periphery of the window opening 13 as being distinctive.

A positional deviation of the vehicle body 1 is expressed by use of a matrix T as follows:

$$T = \begin{bmatrix} T_{11} & T_{12} & T_{13} & T_{14} \\ T_{21} & T_{22} & T_{23} & T_{24} \\ T_{31} & T_{32} & T_{33} & T_{34} \\ 0 & 0 & 0 & 1 \end{bmatrix} \cdot \begin{bmatrix} R & P \\ 0 & 1 \end{bmatrix} \quad (14)$$

where P and R represent matrix of parallel translation and a matrix of rotation, respectively.

A point on the inner periphery in the standard position can be defined as a model and explained in two-dimensional position as follows:

$$\begin{bmatrix} x \\ y \\ z \\ 1 \end{bmatrix} \begin{bmatrix} t \\ a_y t^2 + b_y t + c_y \\ a_z t^2 + b_z t + c_z \\ 1 \end{bmatrix}$$

A shift of the point on the inner periphery from a position (x, y, z 1)$^T$·(t, $a_y t^2 + b_y t + c_y$, $a_z t^2 + b_z t + c_z$, 1)$^T$ to a position (x', y', z', 1)$^T$ gives $$\begin{bmatrix} x' \\ y' \\ z' \\ 1' \end{bmatrix} = T \cdot \begin{bmatrix} x \\ y \\ z \\ 1 \end{bmatrix}$$

Hence $$T^{-1} \cdot \begin{bmatrix} x' \\ y' \\ z' \\ 1' \end{bmatrix} = T \cdot \begin{bmatrix} x \\ y \\ z \\ 1 \end{bmatrix} \quad (16)$$

Rearrangement of the equation (16) by substituting the equations (14) and (15) into the equation (16) gives $$\begin{pmatrix} T_{11} \cdot (x' - T_{14}) + T_{21} \cdot (y' - T_{24}) + T_{31} \cdot (z' - T_{34}) \\ T_{12} \cdot (x' - T_{14}) + T_{22} \cdot (y' - T_{24}) + T_{32} \cdot (z' - T_{34}) \\ T_{13} \cdot (x' - T_{14}) + T_{23} \cdot (y' - T_{24}) + T_{33} \cdot (z' - T_{34}) \\ 1 \end{pmatrix} = \begin{pmatrix} t \\ a_y t^2 + b_y t + c_y \\ a_z t^2 + b_z t + c_z \\ 1 \end{pmatrix}$$

Elimination of a parameter t gives the following two equations for each point on the inner periphery:

$$f_1 = a_y \{T_{11}(x' - T_{14}) + T_{21}(y' - T_{24}) + T_{31}(z' - T_{34})\}^2 +$$

$$b_y \{T_{11}(x' - T_{14}) + T_{21}(y' - T_{24}) + T_{31}(z' - T_{34})\}$$

$$c_y - \{T_{12}(x' - T_{14}) + T_{22}(y' - T_{24}) + T_{32}(z' - T_{34})\} = 0$$

$$f_2 = a_z \{T_{11}(x' - T_{14}) + T_{21}(y' - T_{24}) + T_{31}(z' - T_{34})\}^2 +$$

$$b_z \{T_{11}(x' - T_{14}) + T_{21}(y' - T_{24}) + T_{31}(z' - T_{34})\}$$

$$c_z - \{T_{13}(x' - T_{14}) + T_{23}(y' - T_{24}) + T_{33}(z' - T_{34})\} = 0$$

Here, although twelve unknowns to be obtained are contained in the positional deviation transformation matrix, nevertheless, there are six orthonormal relations represented by the following equations:

$$\begin{cases} T_{11}^2 + T_{12}^2 + T_{13}^2 = 1 \\ T_{21}^2 + T_{22}^2 + T_{23}^2 = 1 \\ T_{21}^2 + T_{22}^2 + T_{23}^2 = 1 \\ T_{11} \cdot T_{21} + T_{12} \cdot T_{22} + T_{13} \cdot T_{23} = 0 \\ T_{21} \cdot T_{31} + T_{22} \cdot T_{32} + T_{23} \cdot T_{33} = 0 \\ T_{31} \cdot T_{11} + T_{32} \cdot T_{12} + T_{33} \cdot T_{13} = 0 \end{cases}$$

Consequently, the positional deviation transformation matrix can be solved by providing more than six restrictive conditions. Because two equations are given for each point on the inner periphery, measuring positional deviations of the vehicle body 1 for at least three distinctive points on the inner periphery of the window opening 13 gives six equations as restrictive conditions. Then, the positional deviation transformation matrix can be obtained by solving them as simultaneous nonlinear equations by the Newton-Raphson method.

Figure 6:
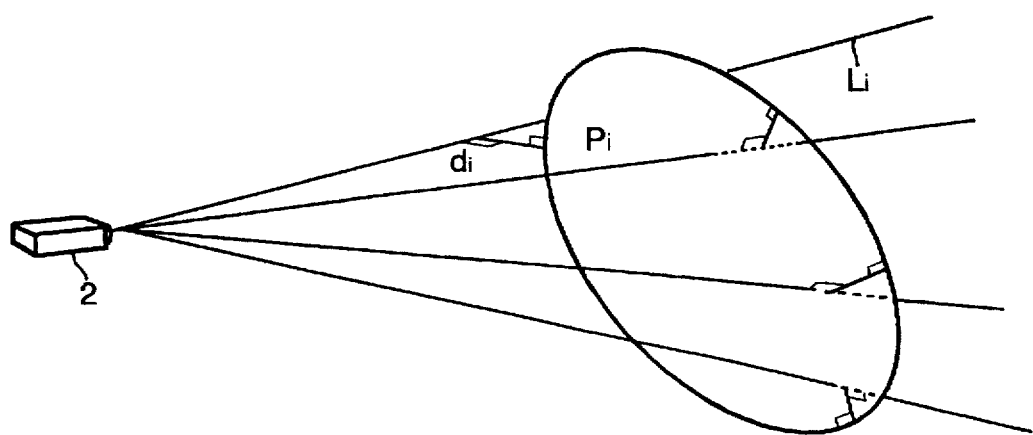
FIG. 6 is a schematic illustration showing a concept of a method of measuring a positional deviation in accordance with another preferred embodiment of the present invention.

Referring to FIG. 6, if an object has a distinctive line such as a circle representing a contour of a cylindrical bore formed therein and the radius of the circle is known for the object in the standard position, any points on the circle are correlated to each other. When the camera 2 provides an image of the circular contour of the object in a specific position, co-ordinates of any point on the circle and a picture element are given as the following determinant:

$$\begin{bmatrix} Hu \\ Hv \\ H \end{bmatrix} = C \begin{bmatrix} x \\ y \\ z \\ 1 \end{bmatrix} \quad (17)$$

where u, v stand for co-ordinates for a picture element and C is a perspective transformation matrix which is called a camera parameter and of a 3–4 type. The camera parameter is a value intrinsic to the camera and previously known.

Expansion of the equation (4) gives the following equations (18):

$$(c_{11} - c_{31}u)x + (c_{12} - c_{32}u)y + (c_{13} - c_{33}u)z + c_{14} - c_{34}u = 0$$

$$(c_{21}-c_{31}v)x+(c_{22}-c_{32}v)y+(c_{23}-c_{33}v)z+c_{24}-c_{34}v=0$$

Since these equations are functions for x, y and z relating to planes, if the co-ordinates u and v are known, they represent simultaneous equations of a line formed by two intersecting planes, namely sight line equations for a line of sight connecting the focal point of the camera and a point (u, v) on an image plane.

Consider that the circle is moved so as to minimize the distance between a sight line given by the determinant (17) and the circumference of the circle. If an equation of sight line Li is given for a distinctive point on a circle on an image, a determination is made as to the smallest distance di from the sight line of a point Pi which is on a converging circle. A necessary number of points on the circle on the image are sampled so as to provide a sum of the square on the distances di for the points as an evaluation function, i.e. $E=\Sigma di^2$. If the evaluation function E is zero (0), it is judged that all of the sight lines intersect the circle, providing accurate co-ordinates of the points in the specific position. An example of finding a solution for the convergence of the evaluation function E to zero (0) is the Fletcher-Powell method.

Figure 7:
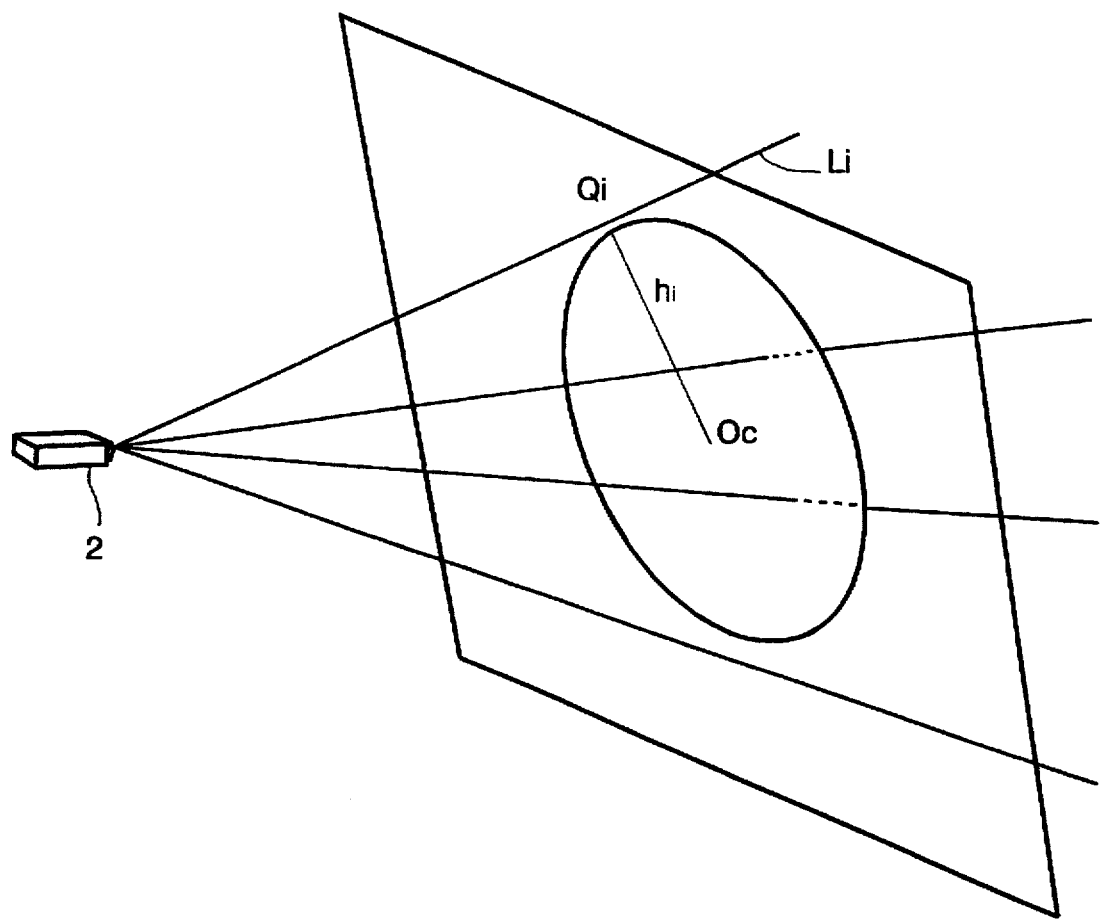
FIG. 7 is a schematic illustration showing a concept of a method of measuring a positional deviation in accordance with still another preferred embodiment of the present invention.

A method of determining three dimensional position in accordance with a further preferred embodiment of the present invention will be hereafter described with reference to FIG. 7. In this embodiment concern is directed to the fact that a circle as a distinctive line lies on one plane.

Co-ordinates of a point in the specific position is obtained by utilization of co-ordinates of the center of the circle and an equation representing the plane on which the circle lies which are readily obtained in the course of finding the position of a circle for the convergence of the evaluation function E to zero (0) in the previous embodiment.

Co-ordinates of the center $O_c$ of the circle in the standard position and an equation representing the plane H on which the circle lies are given by (0, 0, 0) and z=0, respectively. These co-ordinates and equation are transformed by use of the equation (2) as follows:

$$O_c:(x_{oc}, y_{oc}, z_{oc})$$

$$H:a_H x+b_H y+c_H z+d_H=0 \quad (19)$$

On the other hand, a sight line equation, similar to the equation (5), which is obtained from co-ordinates of points on a circle on an image is transformed as follows:

$$r-x_i/l_i=y-y_i/m_i=z-z_i/n_i \quad (20)$$

where $[l_i, m_i, n_i]$ is a vector of a sight line $L_i$ and $[x_c, y_c, z_c]$ is co-ordinate of a camera pin hole.

Co-ordinates of the intersection point $Q_i$ between the plane H and the sight line $L_i$ is obtained by use of the equations (19) and (20). Since when the sight line falls on the circle, the distance $h_i$ between the intersection point $Q_i$ and the center $O_c$ of the circle should be equal to a radius (r) of the circle, the following restrictive condition is given:

$$h_i-r=0 \quad (21)$$

Accordingly, solutions, namely positional deviations, are obtained by simultaneous equations for points on the circle whose number is equal to the number of unknowns.

Figure 8:
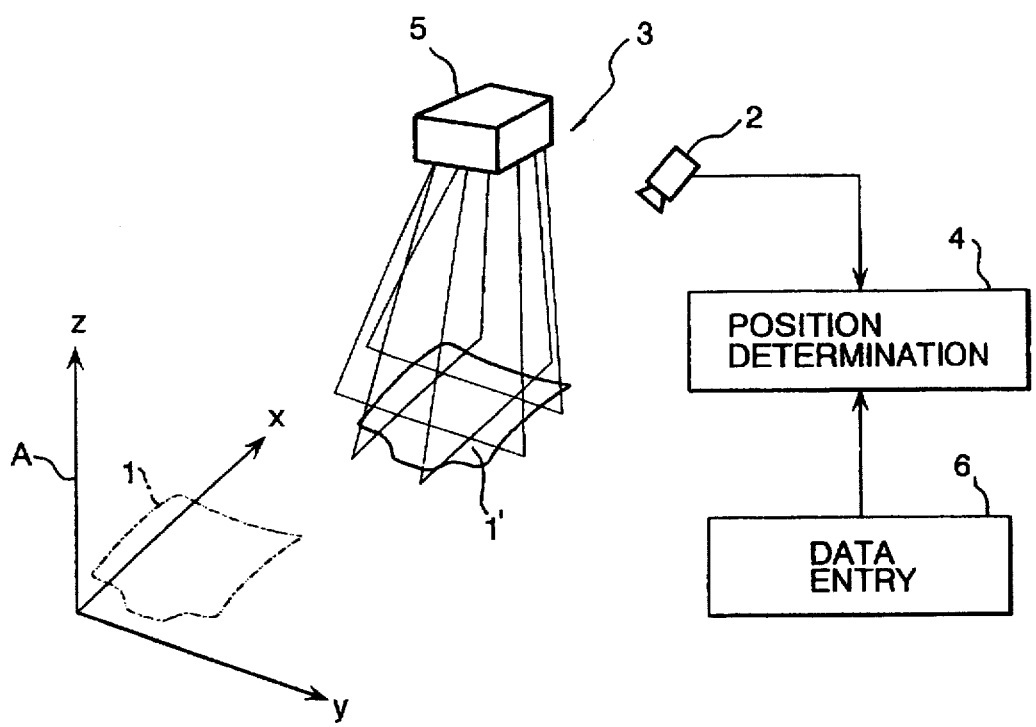
FIG. 8 is a schematic illustration of a measurement unit in accordance with a preferred embodiment of the present invention.

Referring to FIG. 8, which shows a three dimensional position measuring system for a three dimensional position of an object being transported by a transportation line in accordance with a preferred embodiment of the present invention, the instrument position measuring system includes a data entry means 2 such as, for instance, a key board, a contour detection means 3 and a position determination means 4. Data of a position of an object 1 virtually located in a theoretical or standard work position (shown by imaginary line) expressed by a standard co-ordinate system are entered through the data entry means 2. The contour detection means, which includes an illumination source for providing and directing a plurality of line illuminations at regular separations toward an object 1 in a measuring position (depicted by solid line) and a camera forming an image of the object 1, provides data of the measuring position of the object 1 based on the image. The position determination means 4 detects a relation of the measuring position with respect to the virtual object position based on the entered data and detected data.

The entry data contain design data of a three-dimensional contour line, such as a straight line and a curved line, of the object 1 virtually located in the standard position, which is defined by use of predetermined parameters. Specifically, using a as a parameter, x, y and z co-ordinates of a point on a three-dimensional contour line is expressed as fx(a), fy(a) and fz(a), respectively.

A line illumination extends across over the object 1 so as to form highlighted points on the contour line intersecting the line illumination which are imaged as distinctive points by the camera. Positional data of these distinctive points are sent to the position determination means 4.

Figure 9:
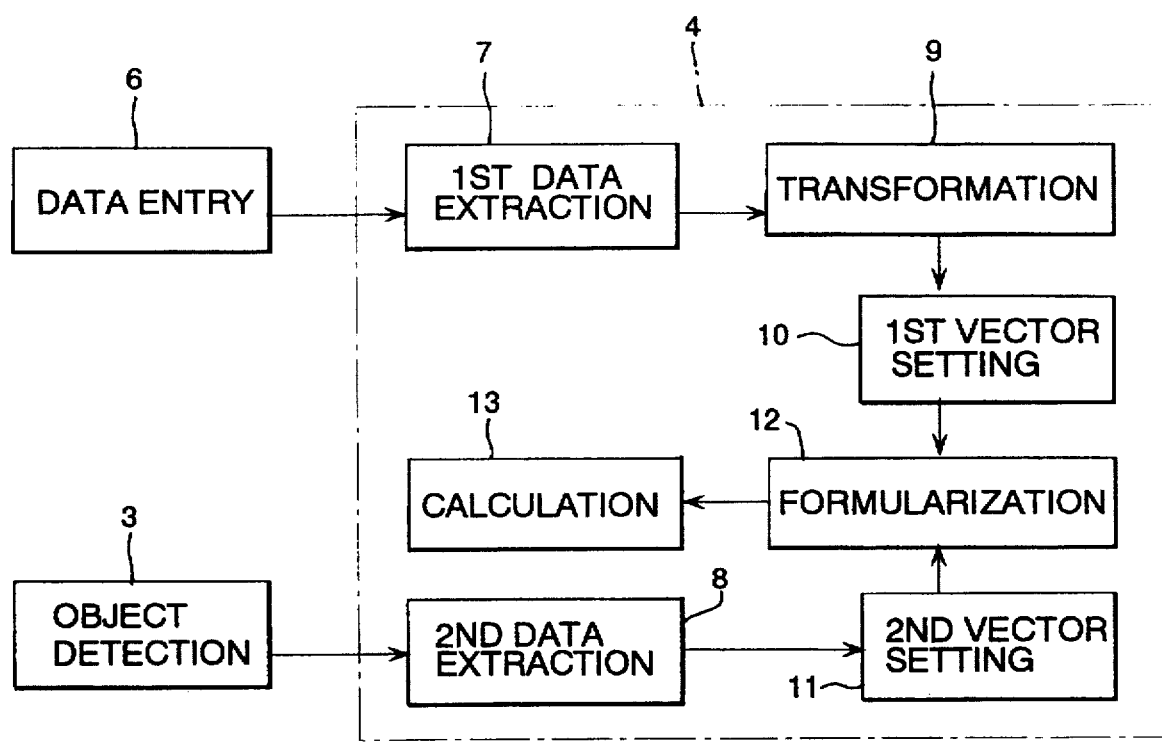
FIG. 9 is a block diagram of a measuring means of the measurement unit.

Referring to FIG. 9, the position determination means 4, which is mainly comprised of a microcomputer, has various functional sections, such as a virtual position data extraction section 7 for the extraction of co-ordinates data of the standard positions of the distinctive points, an actual position data extraction section 8 for the extraction of co-ordinates data of detected actual positions of the distinctive points, and a data transformation section 9 which transforms standard co-ordinates data of the respective distinctive points for position transformation by use of transforming parameters which will be described later. The position determination means 4 further has a first vector setting section 10 for setting vectors of a virtual sight line, which is defined by a straight line connecting the distinctive point, whose position has been transformed, and the focal point of the camera 6, a second vector setting section 11 for setting vectors of an actual sight line, which is defined by a straight line connecting the distinctive point, whose position is provided from the actual position data extraction section 8, and the focal point of the camera 6, a formularizing section 12 for establishing an equation on restrictive condition that an outer product of the vectors of these sight lines is zero (0), and a calculation section 13 for calculating deviations in position and angle of the object in the measuring position with respect to the standard position.

Figure 10:
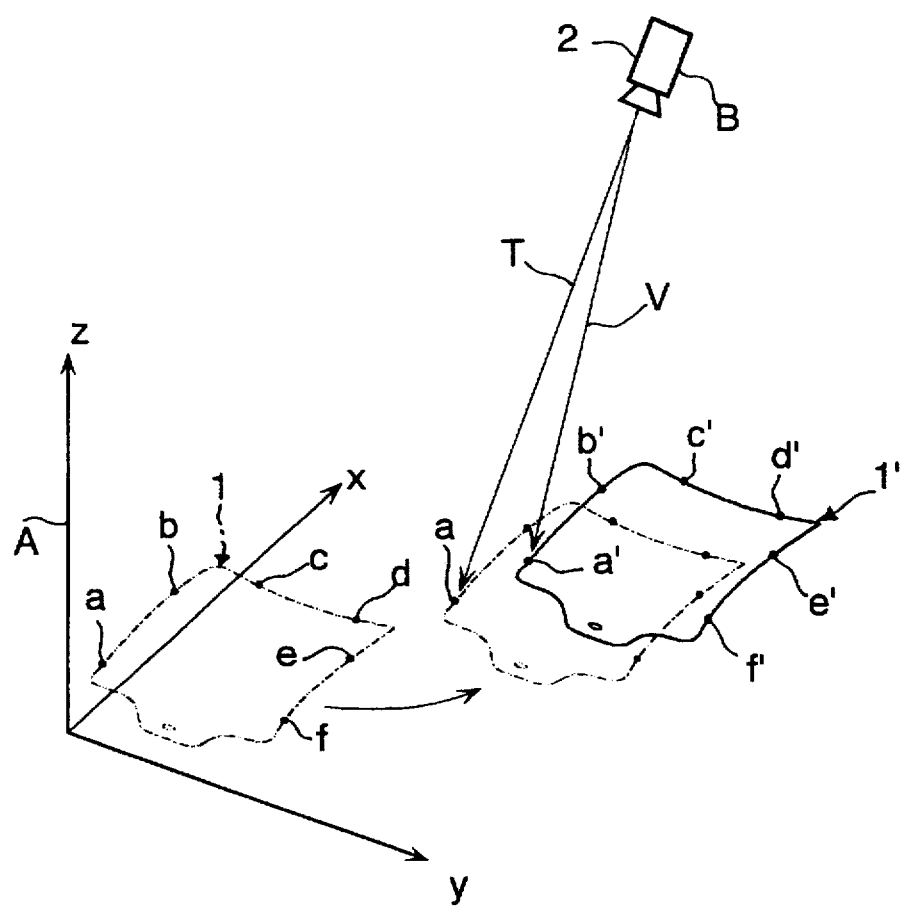
FIG. 10 is an explanatory illustration for describing a method of measuring a positional deviation in accordance with another preferred embodiment of the present invention.

Referring to FIG. 10, position data of the contour line of an object 1, for instance a bonnet or hood of a vehicle, virtually located in the standard work position expressed by a standard co-ordinate system A is entered as data of a three-dimensional curve defined by a parameter a through the data entry means 2. After having extracted data of six distinctive points a–f on the contour line of the object 1 virtually located in the standard positions from the virtual position data extraction section 7, position data transformation is made in the data transformation section 9 by use of position transformation parameters $(X, Y, Z, \phi, \theta, \psi)$, which are unknowns, so as to virtually shift the object in position as shown by dotted line. Based on the position data of the distinctive points a–f of the object virtually located in the standard position, which have been transformed, x, y and z components of vectors T are established for sight lines connecting the focal point B of the camera 6 and the respective distinctive points a–f in the first vector setting section 10.

On the other hand, the contour detection means 3 detects six distinctive points a'–f' formed as highlighted points at the intersections between the contour line and the line illumination whose data of co-ordinates are provided by the actual position data extraction section 8. Based on the position data of the distinctive points a'–f' of the object virtually located in the measuring position, x, y and z components of vectors V are established for sight lines connecting the focal point B of the camera 6 and the respective distinctive points a–f in the second vector setting section 11. Under the restrictive condition that the outer product of these vectors T and V should be zero (0), two simultaneous equations are established for each distinctive point, that is, twelve for the six distinctive points, in the formularizing section 12. By solving these simultaneous equations, the unknown parameter a for each distinctive point and the position transformation parameters (X, Y, Z, $\phi$, $\theta$, $\psi$) are calculated. As was previously described, the position transformation parameters X, Y and Z represent the deviation in parallel position of the object between in the standard position and in the measuring position. Similarly, the position transformation parameters $\phi$, $\theta$ and $\psi$ represent the difference in rotated position of the object between in the standard position and in the measuring position. These parameters give an accurate determination of position of the object in any positions.

Specifically, co-ordinates (x, y, z) of a distinctive point a of the object virtually located in the standard position is expressed by use of the co-ordinate x as a parameter as follows:

$$\begin{pmatrix} x \\ y \\ z \end{pmatrix} = \begin{pmatrix} x \\ f(x) \\ g(x) \end{pmatrix}$$

Transformation of standard co-ordinates (x, y, z) by use of the position transformation parameters (X, Y, Z, $\phi$, $\theta$, $\psi$) gives $$\begin{vmatrix} x' \\ y' \\ z' \\ 1 \end{vmatrix} = \begin{vmatrix} C\phi C\theta C\psi - S\phi S\psi & -C\phi C\theta C\psi - S\phi C\psi & C\phi C\theta & X \\ S\phi C\theta C\psi - C\phi S\psi & -S\phi C\theta S\psi - C\phi C\psi & S\phi S\theta & Y \\ -S\theta C\psi & S\theta S\psi & C\theta & Z \\ 0 & 0 & 0 & 1 \end{vmatrix} \begin{vmatrix} x \\ f(x) \\ g(x) \\ 1 \end{vmatrix}$$

Based on the transformed standard co-ordinates (x', y', z') and co-ordinates ($c_1$, $C_2$, $C_3$) of the focal point B of the camera with respect to the standard co-ordinate system A, components $t_1$, $t_2$, $t_3$ of a vector T of the sight line connecting the focal point B and the distinctive point a are established for x, y and z directions as follows:

$$\begin{vmatrix} (C\phi C\theta C\psi - S\phi S\psi)x - (C\phi C\theta C\psi - S\phi C\psi)f(x) + C\phi C\theta g(x) + X - C_1 \\ (S\phi C\theta C\psi - C\phi S\psi)x - (S\phi C\theta S\psi - C\phi C\psi)f(x) + S\phi S\theta g(x) + Y - C_2 \\ -S\theta C\psi x + S\theta S\psi f(x) + C\theta g(x) + Z - C_3 \end{vmatrix} = \begin{vmatrix} t_1 \\ t_2 \\ t_3 \end{vmatrix}$$

Further, based on co-ordinates (u, v) of a picture element of an image corresponding the distinctive point a and calibration parameters ($c_{11}$–$c_{33}$) for the camera 6, components $v_1$, $v_2$, $v_3$ of a vector V of the sight line connecting the focal point B and the distinctive point a' are established for x, y and z directions as follows:

$$\begin{vmatrix} (C_{12} - C_{32}u)(C_{23} - C_{33}v) - (C_{13} - C_{33}u)(C_{22} - C_{32}v) \\ (C_{13} - C_{33}u)(C_{21} - C_{31}v) - (C_{11} - C_{31}u)(C_{23} - C_{33}v) \\ (C_{11} - C_{31}u)(C_{22} - C_{32}v) - (C_{12} - C_{32}u)(C_{21} - C_{31}v) \end{vmatrix} = \begin{vmatrix} v_1 \\ v_2 \\ v_3 \end{vmatrix}$$

In this instance, it is to be noted that the calibration parameters ($c_{11}$–$c_{33}$) represent values defined as unconditional relations between picture elements of an image provided by the camera and the distinctive point a'.

Letting the outer product of these vectors V and T of the sight lines be zero (0), the following equation are given:

$$\begin{aligned} f_1 &= v_2 \cdot t_3 - v_3 \cdot t_2 \\ &= v_2\{-S\theta C\psi \cdot x + S\theta C\psi \cdot f(x) + C\theta \cdot g(x) + Z - c_3\} - \\ &\quad v_3\{(S\phi C\theta C\psi + C\phi S\psi) \cdot x - (S\phi C\theta C\psi - C\phi S\psi) \cdot f(x) + Y - c_2\} \\ &= 0 \\ f_2 &= v_3 \cdot t_1 - v_1 \cdot t_3 \\ &= v_3\{(C\phi C\theta C\psi \cdot x + S\phi S\psi) \cdot c + (C\phi C\theta S\psi + S\phi S\psi) \cdot f(x) + \\ &\quad (C\phi S\theta \cdot g(x) + X - c_1\} - \\ &\quad \{v_1\{-S\theta C\psi \cdot x + S\theta C\psi \cdot f(x) + C\theta \cdot g(x) + Z - c_3\} = 0 \end{aligned}$$

Equations similar to the above are given for the remaining distinctive points (b–f). By solving these simultaneous nonlinear equations by the Newton-Raphson method, all of the parameters x, X, Y, Z, $\phi$, $\theta$ and $\psi$ are obtained. The Newton-Raphson method is one of numerical solutions in which specific approximate values Xi, Yi, . . . are put as the unknowns X, Y, . . . respectively and substituted into the functions $f_1$, $f_2$, . . . , and also into their partial differential quotients so as to obtain approximate values Xi+1, Yi+1, . . . which are anticipated to be close proximity to the unknowns. These calculations are repeated until convergence of the approximate values is complete.

In the Newton-Raphson method, the partial differential quotients for the functions $f_1$ and $f_2$ are given as follows:

$$\partial f_1/\partial X = 0$$

$$\partial f_1/\partial Y = -v_3$$

$$\partial f_1/\partial Z = v_2$$

$$\partial f_1/\partial \phi = -v_3\{(C\phi C\theta C\psi - S\phi S\psi) \cdot x +$$
$$(C\phi C\theta C\psi + S\phi C\psi) \cdot f(x) + C\phi S\theta \cdot g(x)\}$$

$$\partial f_1/\partial \theta = v_2\{-C\theta C\psi \cdot x + C\theta S\psi \cdot f(x) - S\theta \cdot g(x)\} -$$
$$v_3\{-S\phi S\theta C\psi \cdot x + S\phi S\theta S\psi \cdot f(x) + S\phi C\theta \cdot g(x)\}$$

$$\partial f_1/\partial \psi = v_2\{-C\theta C\psi \cdot x + C\theta S\psi \cdot f(x) - S\theta \cdot g(x)\} -$$
$$v_3\{(-S\phi C\theta S\psi + C\phi C\psi) \cdot x - (S\phi C\theta C\psi + C\phi S\psi) \cdot f(x)\}$$

$$\partial f_2/\partial X = v_3$$

$$\partial f_2/\partial Y = 0$$

$$\partial f_2/\partial Z = -v_1$$

$$\partial f_2/\partial \phi = v_3\{(-S\phi C\theta C\psi - C\phi S\psi) \cdot x + (-S\phi C\theta S C\psi + C\phi C\psi) \cdot f(x) +$$
$$S\phi S\theta \cdot g(x)\}$$

-continued
$$\partial f_2/\partial \theta = v_3\{-S\phi S\theta C\psi \cdot x + C\phi 2S\theta S\psi \cdot f(x) - C\phi C\theta \cdot g(x)\} -$$

$$v_1\{-C\phi C\psi \cdot x + C\theta S\psi \cdot f(x) - S\theta \cdot g(x)\}$$

$$\partial f_2/\partial \psi = v_3\{(-C\phi C\theta S\psi - S\phi S\psi) \cdot x - (C\phi C\theta C\psi - S\phi S\psi) \cdot f(x)\} -$$

$$v_1\{S\theta S\psi \cdot x + S\theta C\psi \cdot f(x)\}$$

$$\partial f_2/\partial x = v_3\{C\phi C\theta C\psi - S\phi S\psi - (C\phi C\theta S\psi + S\theta C\psi) \cdot f(x) + C\phi S\theta \cdot$$

$$g'(x)\} - v_1\{-S\theta C\psi + S\theta S\psi \cdot f(x) + C\theta \cdot g'(x)\}$$

In the numerical solution of the above nonlinear equations, based the position data of the points of the object 1' in the measuring position and the position data of the points of the object 1 virtually located in the standard position, the objects 1 and 1' are examined as to their contour and position so as to estimate and establish initial values of these unknown position transformation parameters (X, Y, Z, $\phi$, $\theta$, $\psi$). In other words, since the Newton-Raphson method starts operation with the initial values as approximate values for the unknowns, it is convenient for shortened operation time to put the initial values as close to true values as possible. For this reason, it is desired to put rough positional deviations, obtained as a result of the examination, as initial values for the proximity values.

As described above, standard co-ordinates of distinctive points on the contour curve, whose number is equal to the number of the position transformation parameters (X, Y, Z, $\phi$, $\theta$, $\psi$) are extracted from the data of a three-dimensional curve representing the contour of an object virtually located in the standard position, which is defined by parameters which are unknowns. After transforming the standard co-ordinates of the distinctive points by use of the position transformation parameters (X, Y, Z, $\phi$, $\theta$, $\psi$), vectors T of sight lines intersecting the distinctive points of the transformed co-ordinates are obtained. Similarly, co-ordinates of distinctive points on the contour curve are extracted from the data of the contour of the object in the measuring position. Then, vectors V of sight lines intersecting the distinctive points of the co-ordinates are obtained. Accordingly, because these vectors T and V give simultaneous equations even though an object does not have any distinctive contour such as having corners, the position of the object is readily found by solving these simultaneous equations. That is, the deviations in position and angle of the object in the object in the measuring position, which is needed to bring the measuring object in conformity with the object virtually located in the standard position, are accurately found from the position transformation parameters (X, Y, Z, $\phi$, $\theta$, $\psi$) which are obtained by solving the simultaneous equations established under restrictive condition that the outer product of the vectors T and V is zero (0) when they are coincident in direction with each other. Accordingly, in spite of shapes or contours of objects 1 being transported into a work position in, for instance, an automobile assembly line, the position of the object 1 in the measuring position is accurately calculated. When teaching an assembling robot the measuring position, the assembling robot performs an automatic precise assembling work on the object 1.

It is to be understood that although it is sufficient to have the sampled distinctive points equal in number to the position transformation parameters (X, Y, Z, $\phi$, $\theta$, $\psi$), nevertheless, more sampled distinctive points than the number of the position transformation parameters (X, Y, Z, $\phi$, $\theta$, $\psi$) may be provided. An increased number of these parameters, which can be obtained by use of the least squares method, provides an improvement of measuring accuracy.

In the case where distinctive points are detected as intersection points between line illuminations and a contour curve of an object on an image of the object, it is easily and accurately performed to find co-ordinates of the distinctive points. In order for the contour detection means 3 to detect the contour line of the object, irradiation of ultrasonic waves toward an object or detection of temperature difference along a contour of an object may be used in place of line illuminations.

Figure 11:
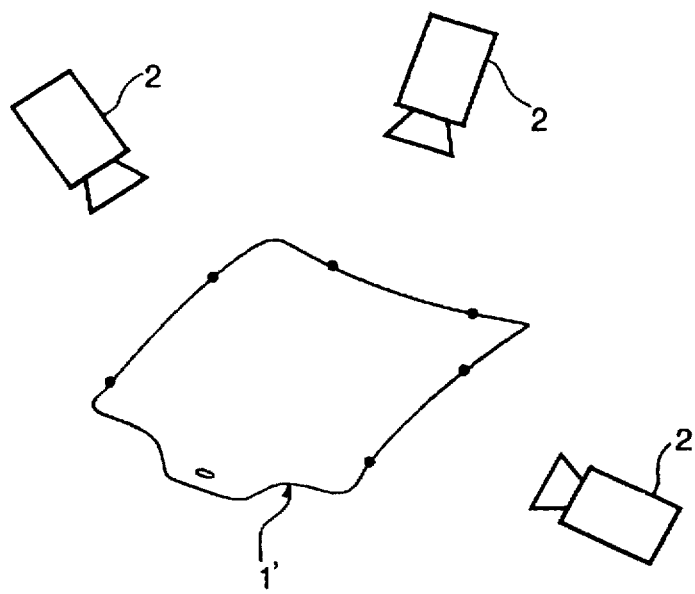
FIG. 11 is an explanatory illustration for describing a method of measuring a positional deviation in accordance with still another preferred embodiment of the present invention.

Referring to FIG. 11, the contour detection means may be provided with a plurality of cameras 2 so as to detect a contour line of an object simultaneously in various directions. Alternatively, a single camera may be moved so as to detect a contour line of an object in various directions in timed sequence. The contour detection means eliminates problems such as the size of an image of the object being reduced according to positions and/or a relative movement of the object with respect to the optical axis of the camera being detected with a lowered accuracy, resulting in the accurate establishment of vectors of sight lines.

Figure 12:
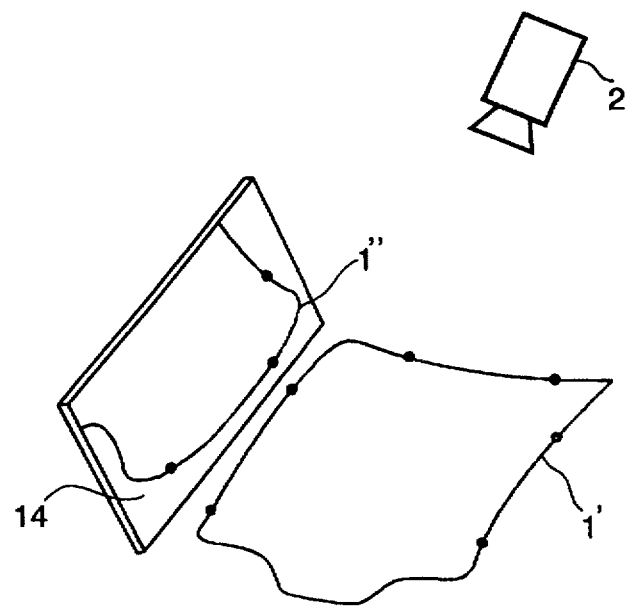
FIG. 12 is an explanatory illustration for describing a method of measuring a positional deviation in accordance with a further preferred embodiment of the present invention.

Referring to FIG. 12, there is provided a mirror 14 as a part of the contour detection means so as to reflect an image of an object 1 toward a camera. This contour detection means can pick up simultaneously a reflected image of the object 1 by the mirror 14 and an image of the object 1, so as detect a contour line of the object 1 in two different directions, thereby providing an increase in the accuracy of detection of a relative movement of the object 1 with respect to the optical axis of the camera.

Figure 13:
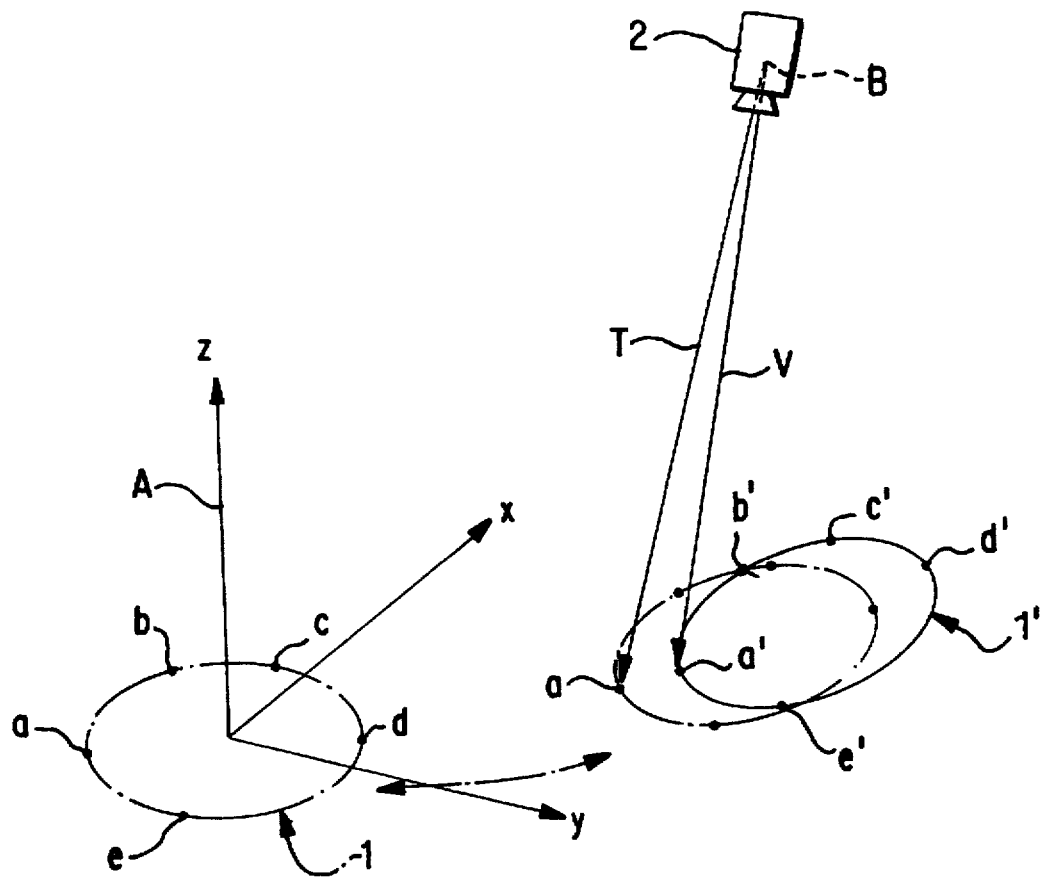
FIG. 13 is an explanatory illustration for describing a method of measuring a positional deviation in accordance with a still further preferred embodiment of the present invention.

Referring to FIG. 13, which shows measurement of position for an object 1' having a circular contour, a standard co-ordinate system A is established such that an x-y plane contains the circular contour with a bary-center on the z-axis. The contour line is defined as a three-dimensional line by use of an angle $\alpha$ between a radius intersecting a point on the circle and the x-axis as a parameter. Since it is not necessary to find an angular deviation in a direction of circumference if the circle is really round, the parameter $\psi$ is put as zero (0) so as to reduce the number of distinctive points by one. Then, the data of the three-dimensional contour line gives the following standard co-ordinates for the distinctive point a:

$$\begin{vmatrix} x \\ y \\ z \end{vmatrix} = \begin{vmatrix} r\cos\alpha \\ r\sin\alpha \\ 0 \end{vmatrix}$$

where r is the radius of the circle.

Transformation of the standard co-ordinates (x, y, z) by use of the position transformation parameters (X, Y, Z, $\phi$, $\theta$) gives $$\begin{vmatrix} x' \\ y' \\ z' \end{vmatrix} - \begin{vmatrix} c_1 \\ c_2 \\ c_3 \end{vmatrix} = \begin{vmatrix} C\phi C\theta & -S\phi & C\phi S\theta & X \\ S\phi C\theta & -C\phi & S\phi S\theta & Y \\ -S\phi & 0 & C\phi & Z \end{vmatrix} \begin{vmatrix} r\cos\alpha \\ r\sin\alpha \\ 0 \\ 1 \end{vmatrix} - \begin{vmatrix} c_1 \\ c_2 \\ c_2 \end{vmatrix}$$

$$= \begin{vmatrix} rC\phi C\theta C\alpha - rS\phi S\alpha + X - c_1 \\ rS\phi C\theta C\alpha + rC\phi S\alpha + Y - c_2 \\ -rS\theta C\alpha + Z - c_3 \end{vmatrix} = \begin{vmatrix} t_1 \\ t_2 \\ t_3 \end{vmatrix}$$

Based on co-ordinate (u, v) of a picture element of the image for the distinctive point a on the circle of the object in the measuring position and calibration parameters ($c_{11}$–$c_{33}$) of the camera 6, components $v_1$, $v_2$, $v_3$ of a vector V of the sight line connecting the focal point B and the distinctive point a' are established for x, y and z directions as follows:

$$\begin{vmatrix} (C_{12} - C_{32}u)(C_{23} - C_{33}v) - (C_{13} - C_{33}u)(C_{22} - C_{32}v) \\ (C_{13} - C_{33}u)(C_{21} - C_{31}v) - (C_{11} - C_{31}u)(C_{23} - C_{33}v) \\ (C_{11} - C_{31}u)(C_{22} - C_{32}v) - (C_{12} - C_{32}u)(C_{21} - C_{31}v) \end{vmatrix} = \begin{vmatrix} v_1 \\ v_2 \\ v_3 \end{vmatrix}$$

Restrictive condition that the outer product of the vectors V and T of the sight lines should be zero (0) gives the following equations:

$$\begin{aligned}
f_1 &= v_2 \cdot t_3 - v_3 \cdot t_2 \\
&= v_2\{-r \cdot S\theta C\alpha + Z - c_1\} - \\
&\quad v_3(r \cdot S\phi C\theta C\alpha + r \cdot C\phi S\alpha + Y - c_2) = 0 \\
f_2 &= v_3 \cdot t_1 - v_1 \cdot t_3 \\
&= v_3(r \cdot C\phi C\theta C\alpha - r \cdot S\phi S\alpha + X - c_1) - \\
&\quad v_1(-r \cdot S\phi C\alpha + Z - c_3) = 0
\end{aligned}$$

Equations similar to the above are given for the remaining distinctive points. By solving these simultaneous nonlinear equations by the Newton-Raphson method, all of the parameters α, X, Y, Z, φ and θ are obtained. In the Newton-Raphson method, the partial differential quotients for the functions $f_1$ and $f_2$ are given as follows:

$$\begin{aligned}
\partial f_1/\partial\phi &= -v_3(r \cdot C\phi C\theta C\alpha - r \cdot S\phi S\alpha) \\
\partial f_1/\partial\theta &= v_2\{-r \cdot C\theta C\alpha\} - v_3(-r \cdot S\phi S\theta C\alpha) \\
\partial f_1/\partial X &= 0 \\
\partial f_1/\partial Y &= -v_3 \\
\partial f_1/\partial Z &= v_2 \\
\partial f_1/\partial\alpha &= v_2\{r \cdot S\theta C\alpha - v_3(-r \cdot S\phi C\theta S\alpha + r \cdot C\phi C\alpha) \\
\partial f_2/\partial\phi &= v_3(-r \cdot S\phi S\theta C\alpha - r \cdot C\phi S\alpha) \\
\partial f_2/\partial\theta &= v_3(-r \cdot C\phi S\theta C\alpha) - v_1(-r \cdot C\theta C\alpha) \\
\partial f_2/\partial X &= v_3 \\
\partial f_2/\partial Y &= 0 \\
\partial f_2/\partial Z &= -v_1 \\
\partial f_2/\partial\alpha &= v_3(-r \cdot C\phi C\theta S\alpha - r \cdot S\phi C\alpha) - v_1(r \cdot C\theta C\alpha)
\end{aligned}$$

As described above, after transforming the standard co-ordinates of the circular line by use of the position transformation parameters (X, Y, Z, φ, θ) and then, determining any distinctive points on the circular line as many as the number of the unknown parameters (X, Y, Z, φ, θ), the relative position of the object 1 in the measuring position with respect to the origin of the standard co-ordinate system as a standard position is found by solving the simultaneous equations to obtain the position transformation parameters (X, Y, Z, φ, θ). Accordingly, even if the entire contour of an object 1 is difficult to be detected, the position of the object 1 is accurately and quickly determined.

It may possibly be effective as a contour line determining method to view a bary-center of a circle in three-dimensions and determine the position of the bary-center. However, if it is difficult to detect the entire contour of an object 1, the determination of a bary-center of the contour is hardly credible, leading to limited applications of the method. Contradistinctively, according to the present invention, even when objects having circular contours are placed in a position off the standard position, they are recognized in position accurately, leading to the performance of correct work an the objects 1. In the case where the standard co-ordinate system A is established such that a circular contour lies on the x-y plane, since a three-dimensional line representing the circular contour of the object 1 virtually placed in the predetermined standard position is defined by simple functions, it is easy to find values for unknowns parameters. In particular, in the case where the standard co-ordinate system A is established such that the circular contour lies on the x-y plane with a bary-center on the z-axis, the three-dimensional line is defined by more simple functions, so that finding values for unknowns parameters is considerably easy.

Whenever it is possible to find the position of a bary-center of a circle contour, it is desirable to use the bary-center as one of distinctive points so as to provide a vector of a sight line intersecting the bary-center besides vectors of sight lines intersecting the distinctive points on the circle. The addition of such a vector makes it more accurate to determine the position of an object 1.

In the embodiments described above, the transformation of co-ordinates may be performed for a measuring position in place for the standard position.

As a numerical solution for the nonlinear simultaneous equations, various method may be available such as a dichotomy method, a regular false method, and the like in place of the Newton-Raphson method.

Although the three-dimensional position determining methods of the present invention have been described in connection with an automobile assembly line in which an object is transported to a work station and located in a position as close proximity to a predetermined standard position as possible, it may be used in a self-travelling robot for transporting components parts of industrial products which drives while recognizing its own travelling position. In such a case, the self-travelling robot is adapted to detect a three-dimensional sign member, which has been located in a predetermined standard position, and recognize a relative position thereof with respect to the sign member.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A method of determining a three-dimensional relative position of an object in a specific position with respect to a predetermined standard position comprising the steps of:

storing a position of a distinctive part of said object virtually located in said standard position which is expressed in a standard three-dimensional co-ordinate system;

formularizing a relation between said specific position and said standard position with respect to said standard three-dimensional co-ordinate system as an equation which includes a positional deviation of said object in said specific position from said standard position as an unknown;

determining a restrictive condition for said position of said distinctive part when said object is located in said specific position; and solving said equation under a condition in which said position of said distinctive part in said specific position expressed by said equation satisfies said restrictive condition, thereby finding said positional deviation;

wherein said step of formularizing includes formularizing an equation defining a line passing through said distinctive part of said object and a center of a lens of a camera for picking up an image of said object, and said step of determining includes determining a restrictive condition in which said distinctive part is on said line when said object is located in said specific position.

2. A method of determining the three-dimensional relative position of an object as defined in claim 1, wherein said distinctive part is a plurality of points on said object.

3. A method of determining the three-dimensional relative position of an object as defined in claim 1, wherein said distinctive part is a line on said object.

4. A method of determining the three-dimensional relative position of an object as defined in claim 1, wherein said distinctive part is a surface of said object.

5. A method of determining a three-dimensional relative position of an object in a specific position with respect to a predetermined standard position comprising the steps of:

storing a position of a distinctive line included in said object virtually located in said standard position which is expressed in a standard three-dimensional co-ordinate system;

providing a straight line, forming one of a plurality of sight lines, with a member formed with a pin hole so that the straight line passes through a specific picture element on an image plane and is formed by an intersection between two planes;

establishing an evaluation function for providing a sum of shortest distances between a plurality of sight lines intersecting said distinctive line included in said object in said specific position and said distinctive line included in said object when said object is located in any position;

deriving co-ordinates of said object at said specific position which converges said evaluation function to approximately zero (0); and calculating a distance of a position expressed by said co-ordinates from said standard position as a deviation of said object.

6. An apparatus for determining a three-dimensional relative position of an object in a specific position with respect to a predetermined standard position comprising:

memory means for storing a position of a distinctive part of said object virtually located in said standard position which is expressed in a standard three-dimensional co-ordinate system;

formularizing means for formularizing a relation between said specific position and said standard position with respect to said standard three-dimensional co-ordinate system as an equation which includes a positional deviation of said object in said specific position from said standard position as an unknown;

condition determination means for determining a restrictive condition for said position of said distinctive part when said object is located in said specific position; and calculation means for solving said equation under a condition in which said position of said distinctive part in said specific position expressed by said equation satisfies said restrictive condition, thereby finding said positional deviation;

wherein said formularizing means further formularizes an equation defining a line passing through said distinctive part of said object and a center of a lens of a camera for picking up an image of said object, and said condition determining means determines a restrictive condition in which said distinctive part is on said line when said object is located in said specific position.

7. An apparatus for determining the three-dimensional relative position of an object as defined in claim 6, wherein said condition determination means includes a camera forming an image of said distinctive part.

8. An apparatus for determining the three-dimensional relative position of an object as defined in claim 7, wherein said distinctive part is more than three points on said object.

9. An apparatus for determining the three-dimensional relative position of an object as defined in claim 7, wherein said distinctive part is at least part of a contour line of said object.

10. An apparatus for determining the three-dimensional relative position of an object as defined in claim 9, wherein said condition determination means retrieves co-ordinates of at least three points on said part of said contour line.

11. An apparatus for determining the three-dimensional relative position of an object as defined in claim 10, wherein said position of said object is determined based on a position obtained based on said three points on said part of said contour line of said object in said specific position and is corrected based on co-ordinates of another point on said contour line of said object in said specific position.

12. An apparatus for determining the three-dimensional relative position of an object as defined in claim 7, wherein said distinctive part is a surface of said object.

13. An apparatus for determining the three-dimensional relative position of an object as defined in claim 7, wherein said condition determination means includes sight line forming means for forming sight lines of said camera.

14. An apparatus for determining the three-dimensional relative position of an object as defined in claim 13, wherein said sight line forming means includes a member formed with a pin hole so as to provide a straight line as said sight line which passes through a specific picture element on an image plane and is formed by an intersection between two planes.

15. An apparatus for determining a three-dimensional relative position of an object in a specific position with respect to a predetermined standard position comprising:

memory means for storing a position of a distinctive line included in said object virtually located in said standard position which is expressed in a standard three-dimensional co-ordinate system;

sight line forming means for forming more than three sight lines of a camera intersecting said distinctive line included in said object in said specific position;

function establishing means for establishing an evaluation function for providing a sum of the shortest distances between said sight lines and said distinctive line of said object located in any position;

co-ordinate deriving means for deriving co-ordinates of said object at said specific position which converges said evaluation function to approximately zero (0); and calculation means for calculating a distance of a position expressed by said co-ordinate from said standard position as a deviation of said object;

wherein said sight line forming means includes a member formed with a pin hole so as to provide a straight line as said sight line which passes through a specific picture element on an image plane and is formed by an intersection between two planes.

* * * * *